(12) United States Patent
Woodman et al.

(10) Patent No.: US 12,666,117 B2
(45) Date of Patent: Jun. 23, 2026

(54) VERIFYING THE RENDERING OF VIDEO CONTENT AT CLIENT DEVICES USING TRUSTED PLATFORM MODULES

(71) Applicant: GOOGLE LLC, Mountain View, CA (US)

(72) Inventors: Oliver Woodman, London (GB); Andrew Benedict Lewis, London (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/828,123

(22) Filed: Sep. 9, 2024

(65) Prior Publication Data

US 2025/0008199 A1     Jan. 2, 2025

Related U.S. Application Data

(60) Division of application No. 18/200,883, filed on May 23, 2023, now Pat. No. 12,114,051, which is a (Continued)

(51) Int. Cl.
H04N 21/44          (2011.01)
G06Q 30/0241       (2023.01)
(Continued)

(52) U.S. Cl.
CPC ..... H04N 21/8352 (2013.01); G06Q 30/0242 (2013.01); G06Q 30/0248 (2013.01); (Continued)

(58) Field of Classification Search
None
See application file for complete search history.

(56) References Cited

U.S. PATENT DOCUMENTS 6,715,076 B1 *   3/2004   Challapali .............. H04N 7/162
                                                              713/176
9,282,088 B2 *   3/2016   Chin ................... H04L 63/0807
                         (Continued)

FOREIGN PATENT DOCUMENTS

EP          2868109 A1      5/2015

OTHER PUBLICATIONS

Examination Report in EP App. No. 17717264.0 dated Apr. 6, 2020, 7 pages.

(Continued)

*Primary Examiner* — Cai Y Chen
(74) *Attorney, Agent, or Firm* — MARSHALL, GERSTEIN & BORUN LLP

(57)                    ABSTRACT

Systems and methods for verifying the rendering of video content on information resources are provided herein. A server can receive, from a target client device, a tracking message purporting to relate to delivery of a target content item; determine whether the tracking message contains an identifier of a sending device that sent the tracking message; determine whether the sending device and the target client device are the same device; if the sending client device and the target client device are the same device: recover, from the tracking message, information about at least a portion of a frame of a content item processed by a trusted platform module of the client device; and compare the at least a portion of the frame of the content item processed by a trusted platform module of the client device with a target content item.

20 Claims, 8 Drawing Sheets

Related U.S. Application Data continuation of application No. 17/845,327, filed on Jun. 21, 2022, now Pat. No. 11,700,433, which is a division of application No. 16/342,334, filed as application No. PCT/US2017/022256 on Mar. 14, 2017, now Pat. No. 11,375,292.

(51) Int. Cl.

| | |
|---|---|
| *G06Q 30/0242* | (2023.01) |
| *H04L 9/40* | (2022.01) |
| *H04N 21/234* | (2011.01) |
| *H04N 21/2347* | (2011.01) |
| *H04N 21/254* | (2011.01) |
| *H04N 21/258* | (2011.01) |
| *H04N 21/4408* | (2011.01) |
| *H04N 21/442* | (2011.01) |
| *H04N 21/647* | (2011.01) |
| *H04N 21/658* | (2011.01) |
| *H04N 21/8352* | (2011.01) |

(52) U.S. Cl.
   CPC ......... *G06Q 30/0277* (2013.01); *H04L 63/00* (2013.01); *H04N 21/23418* (2013.01); *H04N 21/2347* (2013.01); *H04N 21/2541* (2013.01); *H04N 21/25816* (2013.01); *H04N 21/44008* (2013.01); *H04N 21/4408* (2013.01); *H04N 21/44204* (2013.01); *H04N 21/64715* (2013.01); *H04N 21/6581* (2013.01)

(56) References Cited

U.S. PATENT DOCUMENTS

| | | | | |
|---|---|---|---|---|
| 2006/0065716 | A1 | 3/2006 | Peters | |
| 2007/0244820 | A1* | 10/2007 | Westerinen | G06Q 30/02 |
| | | | | 705/52 |
| 2009/0257574 | A1 | 10/2009 | Sim et al. | |
| 2009/0287574 | A1* | 11/2009 | Kane | G06Q 30/02 |
| | | | | 705/14.73 |
| 2011/0225422 | A1 | 9/2011 | Hwang et al. | |
| 2012/0124619 | A1 | 5/2012 | Rowe et al. | |
| 2013/0103716 | A1 | 4/2013 | Yamagishi | |
| 2014/0176553 | A1 | 6/2014 | Petterson et al. | |
| 2014/0176653 | A1 | 6/2014 | Fujie et al. | |
| 2014/0282696 | A1* | 9/2014 | Mao | H04N 21/2547 |
| | | | | 725/32 |
| 2014/0357312 | A1 | 12/2014 | Davis et al. | |
| 2016/0261872 | A1* | 9/2016 | Wang | H04N 19/70 |
| 2016/0381436 | A1 | 12/2016 | Yu et al. | |

OTHER PUBLICATIONS

Examination Report in EP App. No. 17717264.0 dated Jun. 30, 2020, 4 pages.
Examination Report in EP App. No. 17717264.0 dated Dec. 8, 2020, 4 pages.
International Search Report and Written Opinion in International Application No. PCT/US2017/022256 dated Jul. 24, 2017, 23 pages.
International Preliminary Report on Patentability in International Application No. PCT/US2017/022256 dated Sep. 26, 2019, 15 pages.
Extended European Search Report for Application No. 23196683.9, dated Nov. 27, 2023.

\* cited by examiner

Figure 3:
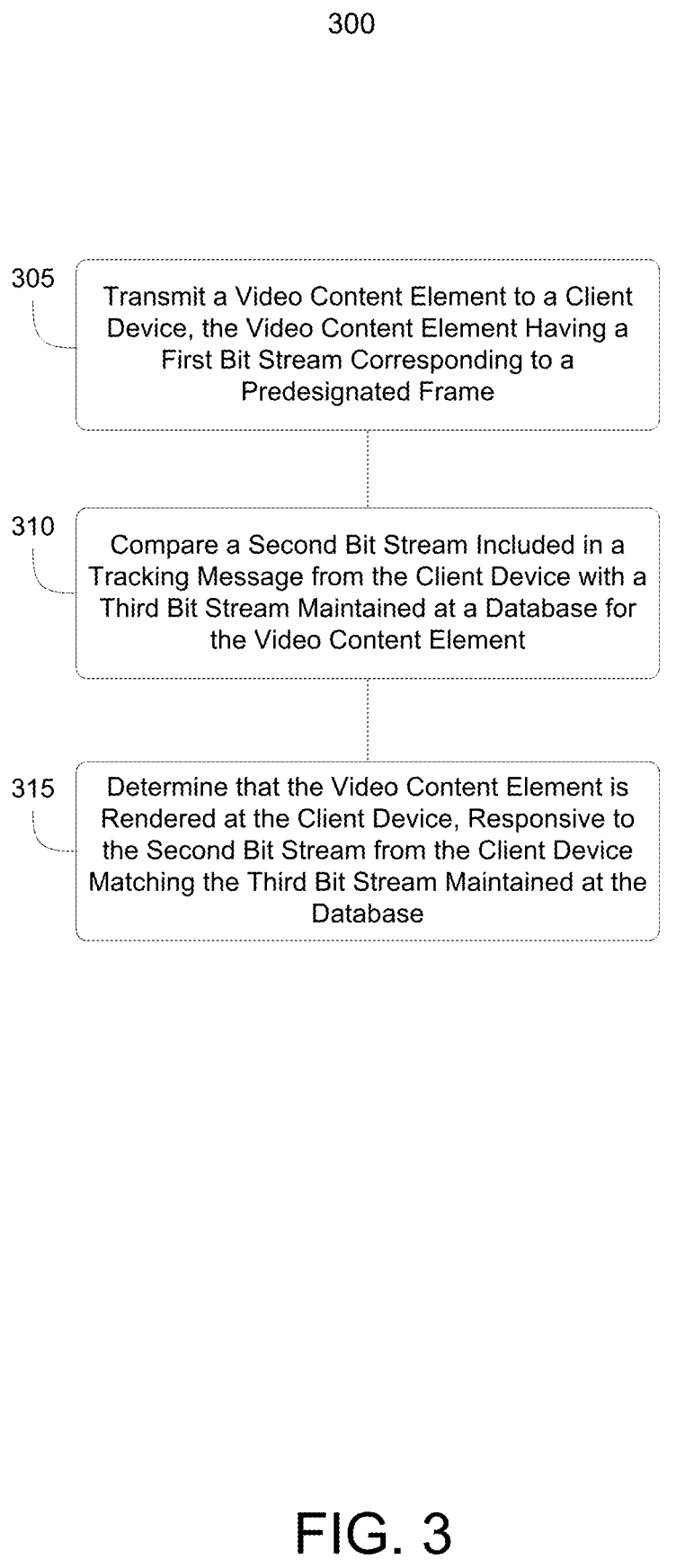

300

305    Transmit a Video Content Element to a Client Device, the Video Content Element Having a First Bit Stream Corresponding to a Predesignated Frame 310    Compare a Second Bit Stream Included in a Tracking Message from the Client Device with a Third Bit Stream Maintained at a Database for the Video Content Element 315    Determine that the Video Content Element is Rendered at the Client Device, Responsive to the Second Bit Stream from the Client Device Matching the Third Bit Stream Maintained at the Database

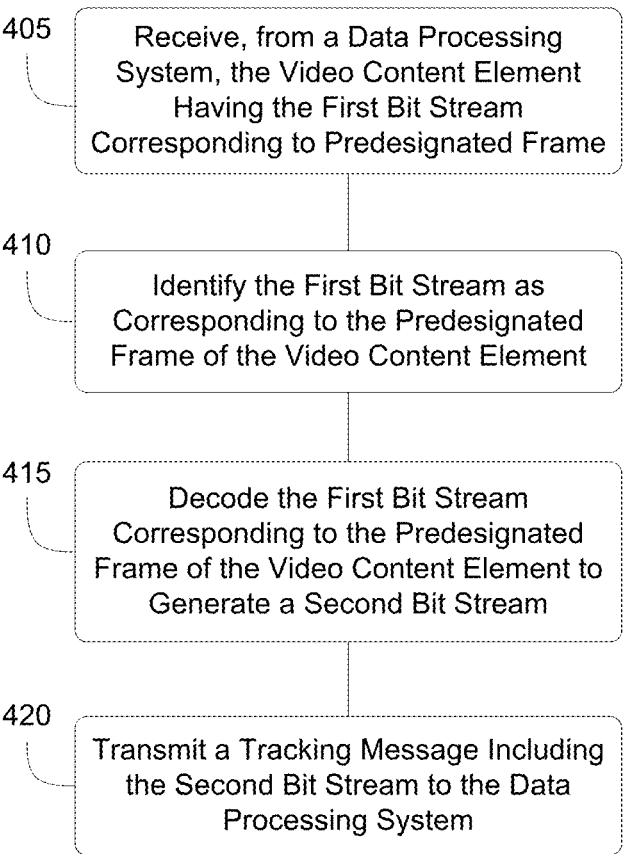

405    Receive, from a Data Processing System, the Video Content Element Having the First Bit Stream Corresponding to Predesignated Frame 410    Identify the First Bit Stream as Corresponding to the Predesignated Frame of the Video Content Element 415    Decode the First Bit Stream Corresponding to the Predesignated Frame of the Video Content Element to Generate a Second Bit Stream 420    Transmit a Tracking Message Including the Second Bit Stream to the Data Processing System

FIG. 4

VERIFYING THE RENDERING OF VIDEO CONTENT AT CLIENT DEVICES USING TRUSTED PLATFORM MODULES

CROSS-REFERENCE TO RELATED APPLICATIONS

The present application is a divisional application of U.S. patent application Ser. No. 18/200,883, entitled "VERIFYING THE RENDERING OF VIDEO CONTENT AT CLIENT DEVICES USING TRUSTED PLATFORM MODULES," filed May 23, 2023, which is a continuation application of U.S. patent application Ser. No. 17/845,327, entitled "VERIFYING THE RENDERING OF VIDEO CONTENT AT CLIENT DEVICES USING TRUSTED PLATFORM MODULES," filed Jun. 21, 2022, which is a divisional application of U.S. patent application Ser. No. 16/342,334, entitled "VERIFYING THE RENDERING OF VIDEO CONTENT AT CLIENT DEVICES USING THE TRUSTED PLATFORM MODULES," filed on Apr. 16, 2019, which is a national phase entry under 35 U.S.C. 371 of International Patent Application No. PCT/US 2017/022, 256, entitled "VERIFYING THE RENDERING OF VIDEO CONTENT AT CLIENT DEVICES USING TRUSTED PLATFORM MODULES," filed on Mar. 14, 2017. The entire contents of each of the preceding applications are hereby expressly incorporated herein by reference.

BACKGROUND

In a computer networked environment, such as the Internet, information resources (e.g., webpages) and the content elements included in such information resources may be parsed and rendered by an application (e.g., a web browser) executing on a client device. It may be difficult to determine whether the content elements on information resources were in fact loaded onto and displayed on client devices.

SUMMARY

In some aspects, the techniques described herein relate to a method of generating a tracking message, the method including: receiving, at a client device, a coded first bit stream representing a content item including a plurality of image frames, the coded first bit stream including a predesignated frame selected, by a server, based on a computation complexity of decoding the predesignated frame; in a trusted platform module of the client device: decoding the first bit stream to recover frames of the content item, generating a second bit stream representative of frames of the content item based on the decoded first bit stream, sending the second bit stream to an output interface; and generating a tracking message including an identification of the client device and information identifying at least a portion of the predesignated frame of the content item processed by the trusted platform module; and transmitting the tracking message from the client device.

In some aspects, the techniques described herein relate to a method, wherein the tracking message includes information identifying the predesignated frame of the content item recovered by the trusted platform module of the client device from the first bit stream.

In some aspects, the techniques described herein relate to a method, wherein the tracking message includes information identifying the last frame of the content item recovered by the trusted platform module of the client device from the first bit stream.

In some aspects, the techniques described herein relate to a method, wherein the tracking message includes information identifying a frame of the content item included in the second bit stream sent by the trusted platform module of the client device to the output interface.

In some aspects, the techniques described herein relate to a method, wherein the tracking message includes information identifying the last frame of the content item included in the second bit stream by the trusted platform module of the client device to the output interface.

In some aspects, the techniques described herein relate to a method, further including authenticating, by the trusted platform module, the tracking message to indicate the tracking message was generated by the trusted platform module before the tracking message is transmitted from the client device.

In some aspects, the techniques described herein relate to a method, wherein sending the second bit stream to the output interface includes sending the second bit stream to the output interface over a secure output path.

In some aspects, the techniques described herein relate to a method, further including encrypting the second bit stream before sending the second data stream to the output interface.

In some aspects, the techniques described herein relate to a system for generating a tracking message, the system including: a client device having one or more processors and a trusted platform module; and a memory storing machine readable instructions that, when executed, cause the client device to: receive a coded first bit stream representing a content item including a plurality of image frames, the coded first bit stream including a predesignated frame selected, by a server, based on a computation complexity of decoding the predesignated frame; in the trusted platform module of the client device: decode the first bit stream to recover frames of the content item, generate a second bit stream representative of frames of the content item based on the decoded first bit stream, send the second bit stream to an output interface; and generate a tracking message including an identification of the client device and information identifying at least a portion of the predesignated frame of the content item processed by the trusted platform module; and transmit the tracking message from the client device.

In some aspects, the techniques described herein relate to a system, wherein the tracking message includes information identifying the predesignated frame of the content item recovered by the trusted platform module of the client device from the first bit stream.

In some aspects, the techniques described herein relate to a system, wherein the tracking message includes information identifying the last frame of the content item recovered by the trusted platform module of the client device from the first bit stream.

In some aspects, the techniques described herein relate to a system, wherein the tracking message includes information identifying a frame of the content item included in the second bit stream sent by the trusted platform module of the client device to the output interface.

In some aspects, the techniques described herein relate to a system, wherein the tracking message includes information identifying the last frame of the content item included in the second bit stream by the trusted platform module of the client device to the output interface.

In some aspects, the techniques described herein relate to a system, wherein the memory stores further machine readable instructions that, when executed, cause the client device to: authenticate, by the trusted platform module, the tracking message to indicate the tracking message was generated by the trusted platform module before the tracking message is transmitted from the client device.

In some aspects, the techniques described herein relate to a system, wherein sending the second bit stream to the output interface includes sending the second bit stream to the output interface over a secure output path.

In some aspects, the techniques described herein relate to a system, wherein the memory stores further machine readable instructions that, when executed, cause the client device to: encrypt the second bit stream before sending the second data stream to the output interface.

In some aspects, the techniques described herein relate to a tangible, non-transitory computer readable medium storing machine readable instructions, for generating a tracking message that, when executed, cause one or more processors of a client device to: receive, at the client device, a coded first bit stream representing a content item including a plurality of image frames, the coded first bit stream including a predesignated frame selected, by a server, based on a computation complexity of decoding the predesignated frame; in a trusted platform module of the client device: decode the first bit stream to recover frames of the content item, generate a second bit stream representative of frames of the content item based on the decoded first bit stream, send the second bit stream to an output interface; and generate a tracking message including an identification of the client device and information identifying at least a portion of the predesignated frame of the content item processed by the trusted platform module; and transmit the tracking message from the client device.

In some aspects, the techniques described herein relate to a tangible, non-transitory computer readable medium, wherein the tracking message includes information identifying the predesignated frame of the content item recovered by the trusted platform module of the client device from the first bit stream.

In some aspects, the techniques described herein relate to a tangible, non-transitory computer readable medium, wherein the tracking message includes information identifying the last frame of the content item recovered by the trusted platform module of the client device from the first bit stream.

In some aspects, the techniques described herein relate to a tangible, non-transitory computer readable medium, wherein the tracking message includes information identifying a frame of the content item included in the second bit stream sent by the trusted platform module of the client device to the output interface.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is flow diagram depicting a method of verifying the rendering of video content on information resources, according to an illustrative implementation;

FIG. 4 is a flow diagram depicting a method of verifying the rendering of video content on information resources, according to an illustrative implementation;

DETAILED DESCRIPTION

Figure 1:
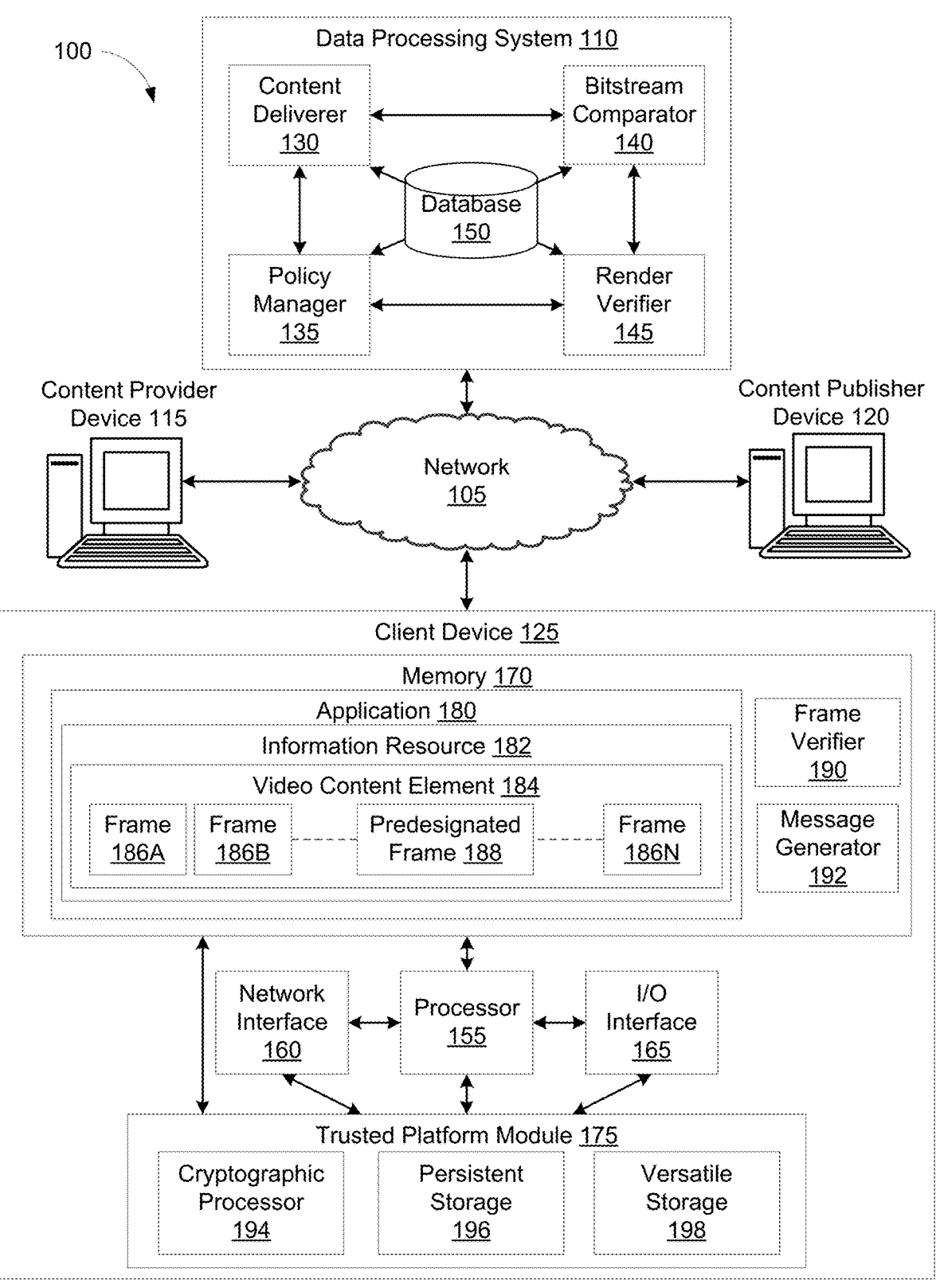
FIG. 1 is a block diagram depicting a computer networked environment for verifying the rendering of video content on information resources, according to an illustrative implementation.

Following below are more detailed descriptions of various concepts related to, and implementations of, methods, apparatuses, and systems of verifying the rendering of video content on information resources. The various concepts introduced above and discussed in greater detail below may be implemented in any of numerous ways, as the described concepts are not limited to any particular manner of implementation.

Under current systems, to maintain a count of impressions, a client device may send a tracking event to a server upon the initial loading of the content element on an information resource. Once the tracking event is received, the server may increment or update the view count for the content element to indicate the number of times the content element was displayed at a client device.

Such tracking events, however, may be inaccurate in validating whether the content element was in fact rendered and displayed on the client device. For one, the tracking event may be generated and sent by the client device as a result of a coding error on the information resource. For another, such tracking events may be susceptible to fraud, as malicious third-party devices may easily generate and send fake tracking events to the server, thereby resulting in an inaccurate count of how many times the content element was actually rendered and displayed on the client device. Compounding to these issues, it may be very difficult to determine whether the receipt of the tracking event is a result of coding error or due to a malicious third-party device.

To address these and other technical challenges, the present systems and methods may leverage the various functionalities of a cryptographic processor (e.g., a digital rights manager of a secure trusted platform module) for decoding media content. A server (e.g., a data processing system) may transmit a video content element to a client device. Within the video content element, one of the frames may be predesignated by the server for generating a tracking message. Under one verification policy ("mode A"), the predesignated frame may be selected from one of the frames of the original video content element, which (or a subset portion of which) is to be processed and rendered by the client device. Under another verification policy ("mode B"), the predesignated frame may be a frame inserted to the original video content that is to be processed but not rendered by the client device.

As the frames of the video content element are processed, the client device may identify the predesignated frame. Having identified the predesignated frame, the cryptographic processor of the client device may decode the bit stream corresponding to the predesignated frame. The decoded bit stream may include data corresponding to the graphic to be rendered on a secure output path (e.g., a display) of the client device. In mode A, the client device may decode the bit stream of the marked subset portion of the predesignated frame to be rendered on the display. In mode B, the client device may decode the bit stream of the predesignated frame but prevent the frame from rendering on the display.

With the predesignated frame decoded, the client device may encrypt the bit stream using various encryption algorithms (e.g., using a private key). The client device may generate a tracking message with the encrypted bit stream and transmit the tracking message to the server. Upon receipt of the tracking message, the server may determine whether the video content element was properly rendered on the client device. If the video content element is determined to have been properly rendered at the client device, the server may make a record of the determination. The server may further update a view counter for the video content element. The techniques used to decode a bit stream may be computationally expensive, especially the predesignated frame. If the last frame in the video content element is selected as the predesignated frame, the decoding operation of the last frame may be dependent to one or more or even all of the previous frames in the video content element, thereby making it computationally expensive to process and decode. As such, malicious third parties may have difficulty to repeatedly mimicking the tracking message, thereby preventing fraudulent tracking events.

FIG. 1 is a block diagram depicting one implementation of an environment for verifying the rendering of video content on information resources. The environment 100 includes at least one data processing system 110 connected to at least one content provider device 115, at least one content publisher device 120, and at least one client device 125 via the network 105.

In further detail, the data processing system 110 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system can include one or more computing devices or servers that can perform various functions. In some implementations, the data processing system can include a content placement system configured to host auctions. In some implementations, the data processing system does not include the content placement system but is configured to communicate with the content placement system via the network 105.

The network 105 can include computer networks such as the Internet local, wide, metro or other area networks, intranets, satellite networks, other computer networks such as voice or data mobile phone communication networks, and combinations thereof. The data processing system 110 of the system 100 can communicate via the network 105, for instance with at least one content provider device 115, at least one content publisher device 120, or at least one client device 125. The network 105 may be any form of computer network that relays information between the client device 125, data processing system 110, and one or more content sources, such as web servers, amongst others. In some implementations, the network 105 may include the Internet and/or other types of data networks, such as a local area network (LAN), a wide area network (WAN), a cellular network, a satellite network, or other types of data networks. The network 105 may also include any number of computing devices (e.g., computers, servers, routers, network switches, etc.) that are configured to receive and/or transmit data within the network 105. The network 105 may further include any number of hardwired and/or wireless connections. The client device 125 may communicate wirelessly (e.g., via WiFi, cellular, radio, etc.) with a transceiver that is hardwired (e.g., via a fiber optic cable, a CAT5 cable, etc.) to other computing devices in the network 105. The client device 125 may also communicate wirelessly with the computing devices of the network 105 via a proxy device (e.g., a router, network switch, or gateway).

The content provider devices 115 can include servers or other computing devices operated by a content provider entity to provide content elements to the content publisher devices 120 or the data processing system 110. The content provided by the content provider device 115 can include third-party content elements for display on information resources, such as a website or webpage, that include primary content, e.g., content provided by the content publisher device 120. The content elements can also be displayed on a search results webpage. The content elements associated with the content provider device 115 can be displayed on information resources other than webpages, such as content displayed as part of the execution of an application on a smartphone or other client device 125. The content publisher devices 120 or the data processing system 110 in turn can select the content elements of the content provider devices 115. The data processing system 110 can run a content placement process to select the content elements based on various performance metrics of the respective content elements. The content publisher devices 120 or the data processing system 110 can transmit the selected content elements of the content provider computing devices for display on information resources at the client devices 125.

The content publisher devices 120 can include servers or other computing devices operated by a content publishing entity to provide primary content for display via the network 105. For instance, the content publisher device 120 can be managed by a webpage operator who provides primary content for display on the webpage. The content publisher devices 120 can also provide third-party content received from the content provider devices 115 for display via the network 105. The primary content can include content other than that provided by the content publisher device 120, and the webpage can include content slots configured for the display of content elements received by the content publisher devices 120 from the content provider devices 115. For instance, the content publisher device 120 can operate the website of a company and can provide content about that company for display on webpages of the website. The webpages can include content slots configured for the display of content elements such as images, text, videos, or any combination thereof received from the content provider device 115. In some implementations, the content publisher device 120 includes a search engine computing device (e.g., a server) of a search engine operator that operates a search engine website. The primary content of search engine webpages (e.g., a results or landing webpage) can include results of a search as well as third-party content elements displayed in content slots, such as content elements from the content provider device 115. In some implementations, the content publisher device 120 can include a server for serving video content.

The content publisher devices 120 can select one or more content elements (e.g., audio, video, image, etc.) received from the content provider devices 115 to include in an information resource with the primary content for display on client devices 125 via the network 105. The content publisher devices 120 can transmit to client devices 125 content elements received from the content provider devices 115 along with the primary content, responsive to a request for content from the client devices 125. In some implementations, subsequent to transmitting the primary content, the content publisher devices 120 can transmit content elements received from the content provider devices 115 to the client devices 125, responsive to a request for additional content from the client devices 125. In some implementations, the content publisher device 120 can receive an initial request for primary content from a client device 125 and in response transmit an information resource including primary content to the client device 125.

The client devices 125 can include computing devices configured to communicate via the network 105 to display data such as the content provided by the content publisher device 120 (e.g., primary webpage content or other information resources) and the content provided by the content provider device 115 (e.g., content elements configured for display in an information resource). The client device 125, the content provider device 115, and the content publisher device 120 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 105. The client device 125 can be a communication device through which an end user can submit requests to receive content. The requests can be requests to a search engine, and the requests can include search queries. In some implementations, the requests can include a request to access a webpage.

The content provider devices 115, the content publisher device 120, and the client device 125 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The content provider devices 115, the content publisher devices 120, and the client device 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider devices 115, the content publisher device 120, and the client device 125 (e.g., a built-in display, microphone, etc.) or external to the housing of content provider devices 115, the content publisher device 120, and the client device 125 (e.g., a monitor connected to the client device 125, a speaker connected to the client device 125, etc.), according to various implementations. For example, the content provider devices 115, the content publisher device 120, and the client device 125 may include an electronic display, which visually displays webpages using webpage data received from one or more content sources and/or from the data processing system 110 via the network 105.

The data processing system 110 can include at least one server. For instance, the data processing system 110 can include a plurality of servers located in at least one data center or server farm. In some implementations, the data processing system 110 includes a content placement system. The data processing system 110 can include at least one content deliverer 130, at least one policy manager 135, at least one bitstream comparator 140, at least one render verifier 145, and at least one database 150.

The content deliverer 130, policy manager 135, bitstream comparator 140, render verifier 145 can include at least one processing unit, server, virtual server, circuit, engine, agent, appliance, or other logic device such as programmable logic arrays configured to communicate with the database 150 and with other computing devices (e.g., the content provider device 115, the content publisher device 120, or the client device 125) via the network 105. The content deliverer 130, policy manager 135, bitstream comparator 140, render verifier 145 can include or execute at least one computer program or at least one script. The content deliverer 130, policy manager 135, bitstream comparator 140, render verifier 145 can be separate components, a single component, or part of the data processing system 110. The content deliverer 130, policy manager 135, bitstream comparator 140, render verifier 145 can include combinations of software and hardware, such as one or more processors configured to execute one or more scripts. The data processing system 110 can also include one or more content repositories or databases 150. The databases 150 can be local to the data processing system 110. In some implementations, the databases 150 can be remote to the data processing system 110 but can communicate with the data processing system 110 via the network 105. The databases 150 can include information resources and content elements to be included in information resources, among others, to serve to a client device 125. Additional details of the data stored in the database 150 are detailed below.

The client devices 125 can include a processor 155, a network interface 160, an input/output (I/O) interface 165, memory 170, and a trusted platform module 175. The processor 155, the network interface 160, the I/O interface 165 (e.g., an electronic display), and the memory 170 may be components described herein in conjunction with FIG. 6. The memory 170 can include instructions for an application 180, a frame verifier 190, and a message generator 192 to be executed by the processor 155. The application 180 may include an Internet browser, a mobile application, or any other computer program capable of executing or otherwise invoking computer-executable instructions processed by the client device 125, such as the computer-executable instructions included in an information resource 182 or the content elements included in the information resource 182. The application 180 may also include a media player or any other computer program capable of processing audiovisual content (e.g., a video content element 184) and rendering the audiovisual content onto the I/O interface 165. In some implementations, the frame verifier 190 and/or the message generator 192 may be standalone components separate from the application 180. In some implementations, the frame verifier 190 and/or the message generator 192 may be part of the application 180. In some implementations, the frame verifier 190 and/or the message generator 192 may be part of the information resource 182 (e.g., as a script) provided by the content publisher device 120 or a video content element 184 provided by the content provider device 115 or the data processing system 110. Additional functionalities of the application 180, the frame verifier 190, and the message generator 192 are detailed herein below.

The information resource 182 and the content elements included therein can correspond to a script, logic, markup, or instructions (e.g., HyperText Markup Language (HTML), Extensible HyperText Markup Language (XHTML), Extensible Markup Language (XML), Cascading Style Sheets (CSS), JavaScript, or any combination thereof). The application 180 can include any number of components, such as a document tree generator, rendering tree generator, and a display module, to process the information resource 182 and the content elements included therein. The document tree generator can parse the information resource 182 to generate a Document Object Model (DOM) tree including the content elements of the information resource 182 arranged in a hierarchical manner. Using the DOM tree, the rendering tree generator can generate a rendering tree specifying the visual properties or attributes of the content elements of the information resource 182. The display module can render and display the information resource 182 onto the I/O interface 165 of the client device 125 based on the rendering tree.

The trusted platform module 175 (sometimes referred to as a cryptoprocessor) may include one or more dedicated microcontrollers for performing secure encryption and decryption functions. The trusted platform module 175 may include a cryptographic processor 194, persistent storage 196, and versatile storage 198. The cryptographic processor 194 may include a pseudo-random number generator, an encryption key generator (e.g., RSA key, elliptic curve cryptography key, Advanced Encryption Standard (AES), etc.), a secure hash generator (e.g., SHA-1, SHA-256, etc.), and a signature engine (e.g., digital signature, etc.). The cryptographic processor 194 may execute various encryption algorithms, such as symmetric-key algorithms, asymmetric-key algorithms, and cryptographic hashing, among others. In some implementations, the persistent storage 196 and/or the versatile storage 198 may be part of the memory 170. In some implementations, the persistent storage 196 and/or the versatile storage 198 may be part of an individual memory unit separate from the memory 170. The persistent storage 196 may include an endorsement key, a storage root key, and a platform configuration register, among others. The versatile storage 198 may include attestation identity keys and a key storage, among others. The components of the trusted platform module 175 and the contents therein may be used to process each frame of the video content element 184. The trusted platform module 175 may include a secure output path to the I/O interface 165 for rendering the processed frames of the video content element 184. Additional functionalities of the trusted platform module 175 are detailed herein below.

In further detail starting with the data processing system 110, the content deliverer 130 can receive a request for video content from the client device 125. The request may be for inserting video content into an information resource 182 loaded by the application 180 of the client device 125. In some embodiments, the request may be generated by the client device 125 in loading the information resource 182. The request for video content can include a device identifier corresponding to the client device 125. The request for video content can include an address for a specific video content element (e.g., using a Uniform Resource Locator (URL) such as "www.example.com/home/example.html"). The request for video content can include an identifier for the specific video content element.

Using the request received from the client device 125, the content deliverer 130 can identify the video content element 184 from the database 150. The database 150 may include one or more video content elements (e.g., a video content element 184) arranged by the address or the identifier. The content deliverer 130 can access the database 150 using the address or identifier for the video content included in the request to retrieve or obtain the video content element 184. The video content element 184 may include one or more frames 186A-186N. In some implementations, the video content element 184 may include a single frame so that the video content element 184 appears as a static image on the I/O interface 165 of the client device 125.

The video content element 184 may be a compressed video. Each of the one or more frames 186A-186N may have an encoding type (e.g., intra-frame or inter-frame). Some of the one or more frames 186A-186N of the video content element 184 may be intra-coded pictures (I-frames). Intra-coded picture frames 186A-186N may include a full static image, independent of the other frames 186A-N. Some of the one or more frames 186A-186N of the video content element 184 may be predicted pictures (P-frames). Predicted picture frames 186A-186N may be dependent on a previous frame 186A-186N and may include changes in the image at the frame 186A-186N from the previous frame 186A-186N. Some of the one or more frames 186A-186N of the video content element 184 may be bi-predictive pictures (B-frames). Bi-predictive picture frames 186A-186N may be dependent on a previous frame and a subsequent frame 186A-186N and may include changes in the image at the frame 186A-186N from the previous and the subsequent frames 186A-186N. The video content element 184 may correspond to a binary sequence (e.g., a byte array or a byte stream). Each of the frames 186A-186N of the video content element 184 may correspond to a portion of the binary sequence (e.g., a bit stream).

With the video content element 184 retrieved from the database 150, the policy manager 135 can select a verification policy to apply to verify rendering of the video content element 184 at the client device 125. There may be two verification policies: a first verification policy and a second verification policy. The policy manager 135 can select the verification policy based on the retrieved video content element 184. In some implementations, the policy manager 135 can identify one or more attributes of the video content element 184 (e.g., time duration, dimensions, file size, etc.) to select the verification policy. The policy manager 135 can select the verification policy based on the client device 125. In some implementations, the policy manager 135 can identify one or more properties of the video content element 184 (e.g., device type, memory, network bandwidth, processing power, etc.) in selecting the verification policy. The policy manager 135 can select the verification policy randomly (e.g., by using a pseudo-number generator). Once selected, the policy manager 135 can modify the video content element 184 in setting or inserting a predesignated frame 188 (sometimes referred to as a check frame) used to verify rendering of the video content element 184 at the client device 125 in accordance with the verification policy. The policy manager 135 can also store the selected verification policy with the identifier for the video content element 184 and the device identifier for the client device 125 on the database 150.

Under the first verification policy (mode A), the policy manager 135 can select at least one of the frames 186A-186N of the video content element 184 as a predesignated frame 188 based on computational complexity in processing the frames 186A-186N. In some implementations, the policy manager 135 can calculate or estimate a computational complexity metric for each frame 186A-186N. The computational complexity metric may include process time, processor usage, memory usage, and power consumption, among other attributes, in processing the respective frame 186A-186N at the client device 125. The policy manager 135 can run a simulated processing of the video content element 184 to measure, among other attributes, an estimated process time, estimated processor usage, estimated memory usage, and estimated power consumption. In estimating the computational complexity metric, the policy manager 135 can identify the encoding type of each frame 186A-186N. The policy manager 135 can then determine changes in the bit stream between each frame 186A-186N based on the identified encoding type to estimate the computational complexity metric.

With the computational complexity metric for each frame 186A-186N calculated, the policy manager 135 can identify the frame 186A-186N corresponding to the highest computational complexity metric. The policy manager 135 can select the frame 186A-186N corresponding to the highest computational complexity metric as the predesignated frame 188. With the predesignated frame 188 corresponding to the frame 186A-186N of the highest computational complexity metric, devices in the network 105 may consume computer resources in processing the predesignated frame 188, thereby making it difficult to generate fraudulent tracking events. In some implementations, the policy manager 135 can identify frames 186A-186N with computational complexity metrics greater than a predetermined threshold. From the identified frames 186A-186N with computational complexity metrics greater than the predetermined threshold, the policy manager 135 can select one frame 186A-186N (or more) as the predesignated frame 188. The policy manager 135 can also identify a bit stream corresponding to the predesignated frame 188. In some implementations, the policy manager 135 can identify the first frame having a computational complexity metric that meets a pre-set threshold as the predesignated threshold, or it may identify all frames 186A-186N having a computational complexity metric that meets a pre-set threshold and select the predesignated frame 188 from these frames 186A-186N. In some implementations, the policy manager 135 can determine the encrypted bit stream corresponding to the predesignated frame 188. The policy manager 135 can store the bit stream corresponding to the predesignated frame 188 in the database 150.

The policy manager 135 can also arbitrarily select at least one of the frames 186A-186N as the predesignated frame 188. In some implementations, the policy manager 135 can identify a last frame 186N of the video content element 184. In some implementations, the policy manager 135 can select, as the predesignated frame, a frame whose decoding operation refers to previous frames 186A-M. As noted, a frame whose decoding operation refers to previous frames is likely to be computationally expensive to decode. The policy manager 135 can select the last frame 186N of the video content element 184 as the predesignated frame 188. In some implementations, the policy manager 135 can generate a frame number using a pseudo-random number generator. The frame number may range from one to a number of frames in the video content element 184. The policy manager 135 can identify the frame 186A-186N corresponding to the generated frame number. The policy manager 135 can select the identified frame 186A-186N as the predesignated frame 188. If the video content element 184 includes a single frame 186A, the policy manager 135 can select the single frame 186A as the predesignated frame 188. The policy manager 135 can also identify a bit stream corresponding to the predesignated frame 188. In some implementations, the policy manager 135 can determine the encrypted bit stream corresponding to the predesignated frame 188. The policy manager 135 can store the bit stream corresponding to the predesignated frame 188 in the database 150.

Still pursuant under the first verification policy, the policy manager 135 can identify a subset portion of one predesignated frame 188. The subset portion may correspond to a rectangular region of the predesignated frame 188 when displayed on the I/O interface 165 of the client device 125. By designating the rectangular region, the data processing system 110 may verify whether the subset portion of the predesignated frame 188 is in fact rendered and displayed at the client device 125. The policy manager 135 can identify pixel dimensions of the rectangular region of the predesignated frame 188. In some implementations, the pixel dimensions can include a top left corner of the rectangular region and a bottom right corner of the rectangular region. The policy manager 135 can select or designate the subset portion of the predesignated frame 188. The policy manager 135 can also identify a bit stream corresponding to designated subset portion of the predesignated frame 188. In some implementations, the policy manager 135 can calculate the bit stream corresponding to the subset portion of the predesignated frame 188. The policy manager 135 can store the identified bit stream in the database 150.

Under the second verification policy (mode B), the policy manager 135 can generate and insert a new frame into the video content element 184 as the predesignated frame 188. In some implementations, multiple new frames may be inserted into the video content element 184 as predesignated frames 188. The policy manager 135 can generate the new frame into the video content element 184 as the predesignated frame 188 using any encoding type. In some implementations, the policy manager 135 can generate the predesignated frame 188 as an intra-coded picture independent of any frame 186A-186N in the video content element 184.

In some implementations, the policy manager 135 can generate the predesignated frame 188 as a bi-predictive picture by using a previous and a subsequent frame 186A-186N. In some implementations, the policy manager 135 can generate the predesignated frame 188 as a predictive picture by using the previous frame 186A-186N. To prevent corruption or degradation of the video content element 184 when the new frame is inserted, the policy manager 135 can generate the predesignated frame 188 as a dummy frame to preserve the encoding of the video content from the previous frame 186A-186N to the subsequent frame 186A-186N. In some implementations, the policy manager 135 can set a rendering-enabled property of the predesignated frame 188 to null in order to prevent rendering of the predesignated frame 188 at the client device 125, thereby making the predesignated frame 188 the dummy frame. The policy manager 135 can then insert the predesignated frame 188 into the video content element 184. If the encoding type is predicted or bi-predictive, the predesignated frame 188 may be inserted by the policy manager 135 at the corresponding sequence in the video content element 184. In some implementations, the policy manager 135 can insert the predesignated frame 188 into the video content element 184 as the very last frame. The policy manager 135 can also identify a bit stream corresponding to the predesignated frame 188. In some implementations, the policy manager 135 can determine the encrypted bit stream corresponding to the predesignated frame 188. The policy manager 135 can store the bit stream corresponding to the predesignated frame 188 in the database 150.

To indicate to the client device 125 to use the predesignated frame 188 to send a verification message, the policy manager 135 can include a designation indicator in the video content element 184. In some implementations, the designation indicator may include a verification policy identifier corresponding to the selected verification policy. In some implementations, the designation indicator may include the pixel dimensions corresponding to the subset portion of the predesignated frame 188. In some implementations, the policy manager 135 can insert the designation indicator at the predesignated frame 188 as a mark (e.g., a watermark or other invisible or imperceptible marker). In some implementations, the policy manager 135 can insert the designation indicator in a header of the predesignated frame 188. In some implementations, the policy manager 135 can insert the designation indicator in the metadata of the video content element 184. The designation indicator included in the metadata may include a frame number corresponding to the predesignated frame 188. In some implementations, the policy manager 135 can transmit the designation indicator to the client device 125 separately from the video content element 184.

With the predesignated frame 188 selected or inserted into the video content element 184, the content deliverer 130 can transmit the video content element 184 via the network 105. The transmission of the video content element 184 may include streaming of the frames 186A-186N (e.g., as chunks). In some implementations, the content deliverer 130 can also transmit the frame verifier 190. In some implementations, the content deliverer 130 can also transmit the message generator 192. The frame verifier 190 and the message generator 192 may be used by the client device 125 to process the predesignated frame 188 to verify that the video content element 184 is rendered at the client device 125. In some implementations, the frame verifier 190 and/or the message generator 192 may be previously loaded at the client device 125.

Prior to transmission, the content deliverer 130 can encrypt the video content element 184 prior to transmission using various encryption algorithms (e.g., digital rights management schema such as Diffie-Hellman key exchange). The encryption and decryption of the video content element 184 may be computationally complex. As such, it may be computationally expensive for other devices in the network 105 attempting to decrypt the video content element 184 to send fake tracking events in the manner detailed herein to boost the view counts of the video content element 184. By preventing fake tracking events, the system 100 may improve verification of the rendering the video content element 184 at the client devices 125 connected to the network 105, thereby resulting in a more accurate view count for the video content element 184 as well as verifying the rendering of the content.

Subsequent to the request for video content, the client device 125 can then receive the video content element 184 from the content deliverer 130. In some implementations, the client device 125 can receive the designation indicator with the video content element 184. In some implementations, the client device 125 can receive the designation indicator separate from the video content element 184 from the policy manager 135. In some implementations, the client device 125 can receive the frame verifier 190 from the content deliverer 130. In some implementations, the client device 125 can receive the message generator 192 from the content deliverer 130.

Having loaded the video content element 184, the application 180 can start to play the one or more frames 186A-186N of the video content element 184. The playing of the video content element 184 may include streaming of the one or more frames 186A-186N as the frames 186A-186N as received from the content deliverer 130. In processing the one or more frames 186A-186N of the video content element 184, the application 180 can invoke the trusted platform module 175 to identify the bit stream corresponding to the frame 186A-186N and to decrypt the bit stream for rendering and display the frame 186A-186N on the I/O interface 165 (as a secured output path).

As the video content element 184 is processed, the frame verifier 190 can determine whether the current frame 186A-186N is the predesignated frame 188. The frame verifier 190 can use the designation indicator to identify the predesignated frame 188. In some implementations, the frame verifier 190 can use an image recognition algorithm to recognize the mark on the predesignated frame 188 to identify the current frame 186A-186N as the predesignated frame 188. In some implementations, the frame verifier 190 can read the header of the current frame 186A-186N to identify the designation indicator to determine that the current frame 186A-186N is the predesignated frame 188. In some implementations, the frame verifier 190 can read the metadata of the video content element 184 to identify the predesignated frame 188. The reading of the metadata may be prior to the playing of the video content element 184.

If the current frame 186A-186N is not the predesignated frame 188, the application 180 may continue processing the video content element 184. The application 180 can render the current frame 186A-186N. The application can then identify the next frame 186A-186N. The frame verifier 190 can then again determine whether the frame 186A-186N is the predesignated frame 188 using the above listed techniques. This process may be repeated until the end of the video content element 184.

If the current frame 186A-186N is the predesignated frame 188, the frame verifier 190 can identify which verification policy is to be applied for verifying the rendering of the video content element 184. In some implementations, the frame verifier 190 can identify which verification policy is to be applied based on the designation indicator indicating the verification policy selected by the policy manager 135. In some implementations, the frame verifier 190 can identify which verification policy is to be applied based on a rendering-enabled property of the predesignated frame 188. If the rendering-enabled property of the predesignated frame 188 is set to true, the frame verifier 190 may identify that the first verification policy is to be applied. If the rendering-enabled property of the predesignated frame 188 is set to null, the frame verifier 190 may identify that the second verification policy is to be applied. Using the identified verification policy, the frame verifier 190 can invoke the trusted platform module 175 to encode the predesignated frame 188 for verifying the rendering of the video content element 184 at the client device 125.

Under the first verification policy, the frame verifier 190 can allow the application 180 to render the predesignated frame 188 for display on the I/O interface 165. In some implementations, the frame verifier 190 can identify the bit stream corresponding to predesignated frame 188. The bit stream may have been encrypted by the content deliverer 130. Using the identified bit stream, the frame verifier 190 can invoke the trusted platform module 175 to decrypt the bit stream corresponding to the predesignated frame 188 to generate another bit stream using various decryption techniques (e.g., Diffie-Hellman key exchange, RSA, etc.). In some implementations, the frame verifier 190 can identify the predesignated frame 188 (e.g., using a frame sequence number). The frame verifier 190 can then invoke the trusted platform module 175 to decrypt the bit stream corresponding to the predesignated frame 188 by identifying the predesignated frame 188. The decoded bit stream may be part of the binary sequence used by the application 180 to render and display the video content element 184 on the I/O interface 165. In this manner, the frame verifier 190 can verify the rendering of the video content element 184 including the predesignated frame 188 at the client device 125.

In some implementations, the decoded bit stream may correspond to the designated subset portion of the predesignated frame 188. The frame verifier 190 can identify the designated subset portion of the predesignated frame 188 from the designation identifier. In some implementations, the frame verifier 190 can identify the pixel dimensions of the subset portion of the predesignated frame 188 from the designation identifier. In some implementations, the frame verifier 190 can identify the bit stream corresponding to designated subset portion of the predesignated frame 188 or the pixel dimensions of the subset portion of the predesignated frame 188. Using the identified bit stream, the frame verifier 190 can invoke the trusted platform module 175 to decrypt or otherwise recover the bit stream corresponding to the predesignated frame 188 to generate another bit stream using various decryption techniques (e.g., Diffie-Hellman key exchange, RSA, cryptographic hash, etc.). The framer verifier 190 can invoke the trusted platform module 175 to decrypt the bit stream corresponding to the predesignated frame 188 by identifying the subset portion of the predesignated frame 188 or the pixel dimensions of the subset portion of the predesignated frame 188. The decoded bit stream may be part of the binary sequence used by the application 180 to render and display the subset portion of whatever is displayed within the pixel dimensions on the I/O interface 165. In this manner, the frame verifier 190 can verify whether the rendering of the video content element

184 including the subset portion of the predesignated frame 188 at the client device 125 is free from any occlusions.

Figure 2A:
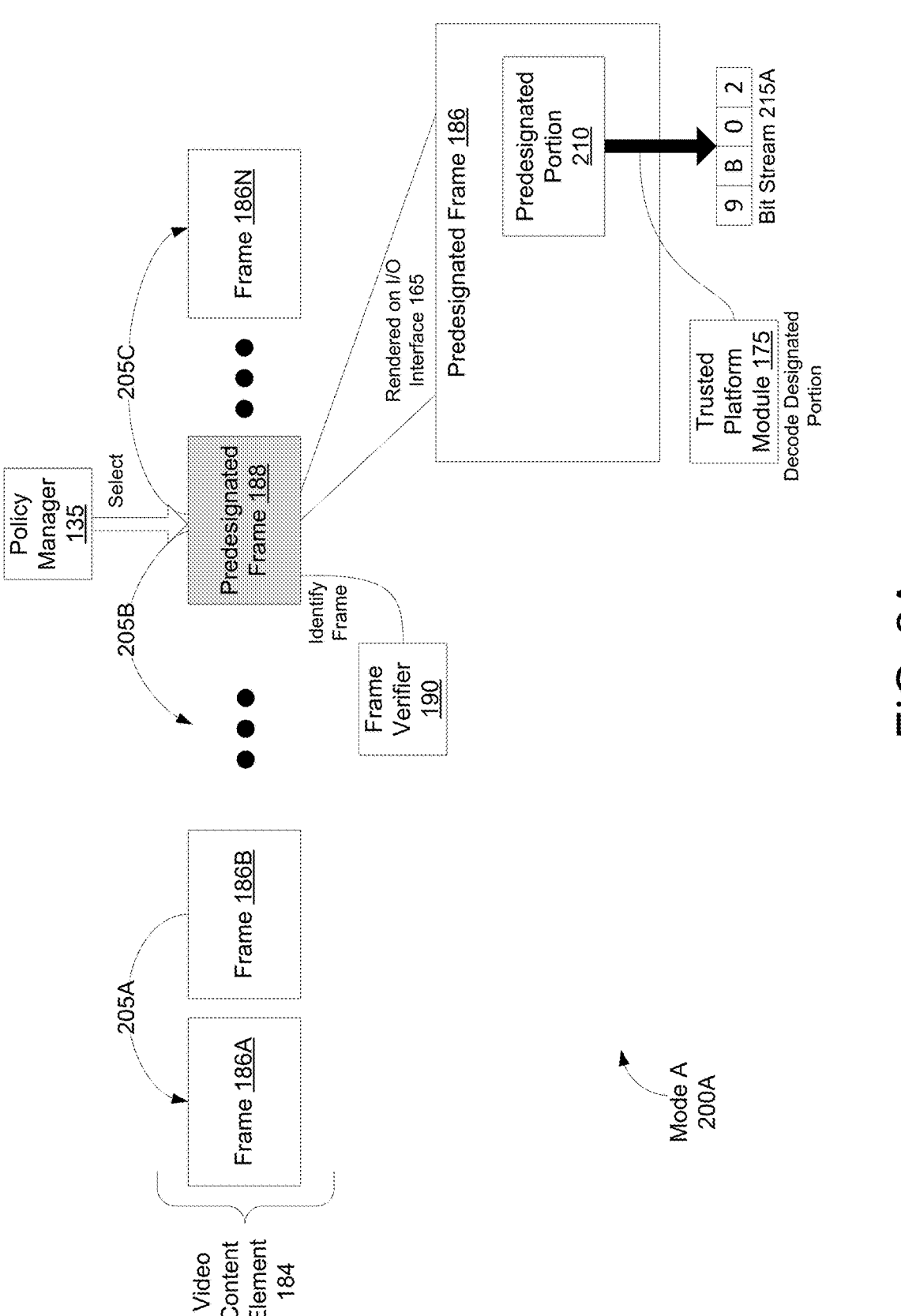
FIGS. 2A and 2B are block diagrams each depicting a flow process of verifying the rendering of video content on information resources under various verification policies, according to an illustrative implementation.

Now referring to FIG. 2A, FIG. 2A is a block diagram depicting a flow process of verifying the rendering of the video content element 184 under the first verification policy (mode A 200A). In the context of system 100, the policy manager 135 may have selected one of the frames 186A-186N of the video content element 184 as the predesignated frame 188. The second frame 186B may be a P-frame with a backward dependency 205A on the previous frame 186A. The predesignated frame 188 may be a B-frame with a backward dependency 205B on one of the previous frames 186A-186N and with a forward dependency 205C the next frame 186N. The frame verifier 190 may have identified the predesignated frame 188 using the designation identifier and may have identified a predesignated subset portion 210. The predesignated frame 188 may be rendered on the I/O interface 165, along with the other frames 186A-186N. The frame verifier 190 can invoke the trusted platform module 175 to decrypt the encoded bit stream corresponding to the rendering of the predesignated subset portion 210 to generate the bit stream 215A (e.g., "9B02"). The bit stream 215A may be used to generate a tracking message as will be detailed herein.

Returning to FIG. 1, under the second verification policy, with the rendering enabled property of the predesignated frame 188 set to null, the application 180 may drop the rendering of the predesignated frame 188. In some implementations, the frame verifier 190 can identify the bit stream corresponding to predesignated frame 188. The bit stream may have been encrypted by the content deliverer 130. Using the identified bit stream, the frame verifier 190 can invoke the trusted platform module 175 to decrypt or otherwise recover the bit stream corresponding to the predesignated frame 188 to generate another bit stream using various decryption techniques (e.g., Diffie-Hellman key exchange, RSA, cryptographic hash, etc.). In some implementations, the framer verifier 190 can identify the predesignated frame 188 (e.g., using a frame sequence number). The framer verifier 190 can then invoke the trusted platform module 175 to decrypt the bit stream corresponding to the predesignated frame 188 by identifying the predesignated frame 188. The decoded bit stream may be part of the binary sequence used by the application 180 to process the video content element 184 for rendering onto the I/O interface 165 had the rendering property of the predesignated frame 188 been set to true. In this manner, the frame verifier 190 can verify the rendering of the video content element 184 without actually rendering the predesignated frame 188 at the client device 125.

Figure 2B:
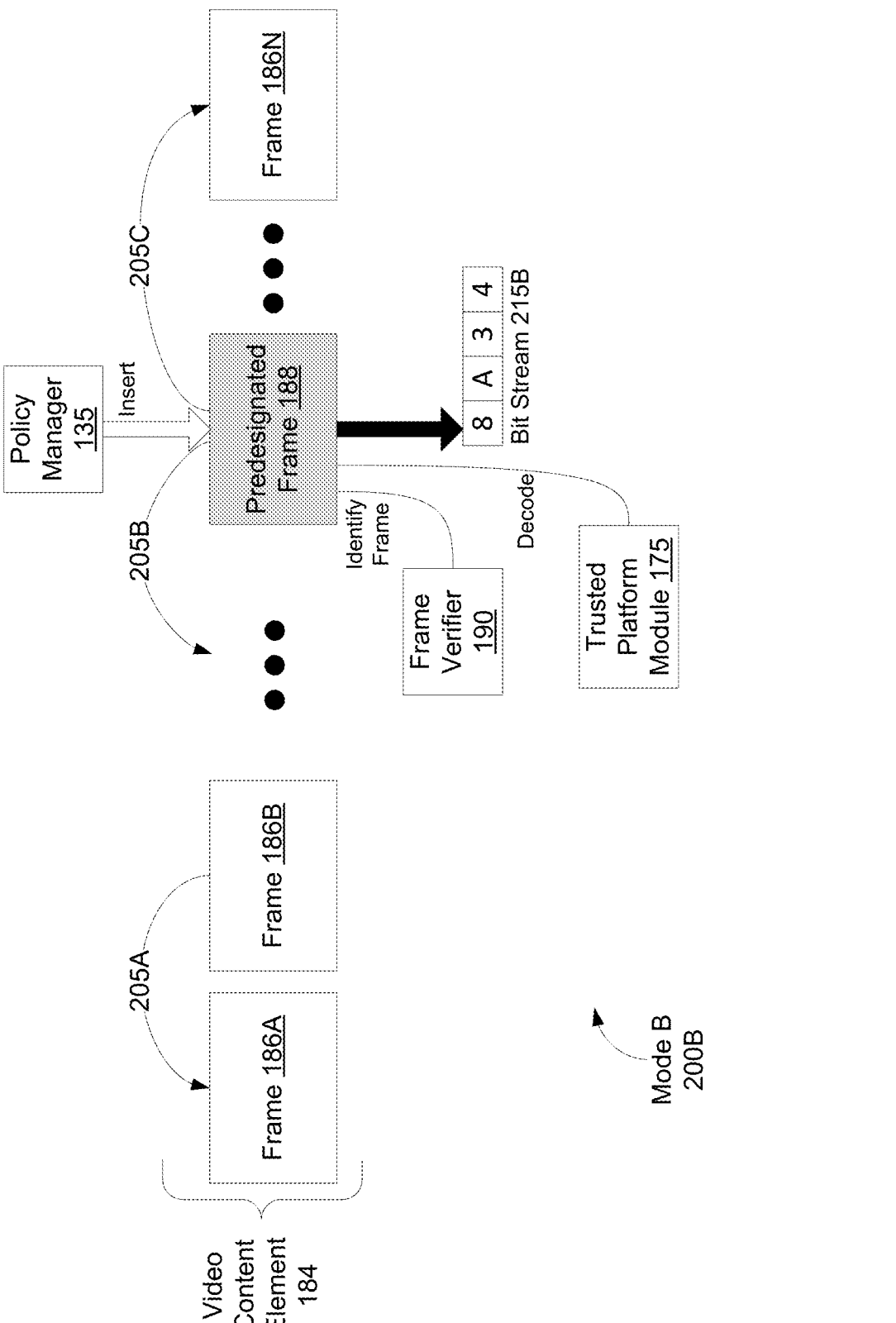

Now referring to FIG. 2B, FIG. 2B is a block diagram depicting a flow process of verifying the rendering of the video content element 184 under the second verification policy (mode B 200B). In the context of system 100, the policy manager 135 may have inserted the predesignated frame 188 into one of the frames 186A-186N of the video content element 184. The second frame 186B may be a P-frame with a backward dependency 205A on the previous frame 186A. The predesignated frame 188 may be a B-frame with a backward dependency 205B on one of the previous frames 186A-186N and with a forward dependency 205C the next frame 186N. The rendering-enabled property of the predesignated frame 188 may be set to null, thereby preventing rendering or display on the I/O interface 165. The frame verifier 190 may have identified the predesignated frame 188 using the designation identifier. The frame verifier 190 can invoke the trusted platform module 175 to decrypt the encoded bit stream corresponding to the predesignated frame 188 to generate the bit stream 215B (e.g., "8A34"). The bit stream 215B may be used to generate a tracking message as will be detailed herein.

Returning again to FIG. 1, with the bit stream of the predesignated frame 188 decoded, the message generator 192 can generate a tracking message for transmission to the data processing system 110. The tracking message may include information identifying the predesignated frame 188. The information identifying the predesignated frame 188 may include a frame identifier (e.g., a frame sequence number). The tracking message may also include the device identifier corresponding to the client device 125. The tracking message may also include the identifier or address corresponding to the video content element 184. The tracking message may include a video content identifier corresponding to the video content element 184. The tracking message may also include a time stamp corresponding to a time (e.g., year, day, hour, minute, second, etc.) that the video content element 184 was played at the client device or that the predesignated frame 188 was decoded by the frame verifier 190. The tracking message may include the decoded bit stream corresponding to the predesignated frame 188. In some implementations, the tracking message may include the decoded bit stream corresponding to the subset portion of the predesignated frame 188. Once generated, the message generator 192 can transmit the tracking message to the data processing system 110.

In some implementations, prior to transmission of the tracking message, the message generator 192 can invoke the trusted platform module 175 to encrypt the decoded bit stream corresponding to the predesignated frame 188 or the subset portion of the predesignated frame 188. The trusted platform module 175 may encrypt, authenticate, or otherwise sign the decoded bit stream using an encryption key (e.g., a public key provided by the data processing system 110). The encryption key may have been received with the video content element 184 or the designation indicator for the predesignated frame 188. The message generator 192 can include or insert the encrypted decoded bit stream into the tracking message. In some implementations, the message generator 192 can insert or include the encryption key used to encrypt, authenticate, or otherwise sign the decoded bit stream into the tracking message.

The message generator 192 can invoke the trusted platform module 175 to generate a combination value using the information included in the tracking message (e.g., the frame identifier, the video content identifier, device identifier, time stamp, and/or decoded bit stream corresponding to the predesignated frame 188, etc.). In some implementations, the combination value may be a keyed-hash message authentication code (HMAC) generated based on the information included in the tracking message and an encryption key (e.g., a secret hash key). In some implementations, the message generator 192 can include or insert the encryption key used to generate the combination value (e.g., HMAC) into the tracking message. In some implementations, the tracking message may be of the form {<time stamp, video content identifier, frame identifier, device identifier, and decoded bit stream>, key}. In some implementations, the encryption key included in the tracking message may differ from the one used to generate the combination value (e.g., with extra padded zeroes).

The message generator 192 can then transmit the tracking message with the encrypted decoded bit stream to the data processing system 110. The decoded bit stream for the predesignated frame 188 or the subset portion thereof may be hidden from devices connected to the network 105 that intend to create fraudulent tracking events to boost a view count for the video content element 184, thus resulting in a more accurate count of the number of times the video content element 184 was in fact rendered and displayed at the client device 125.

Upon receipt of the tracking message, the bitstream comparator 140 can compare the bit stream included in the tracking message with the bit stream identified at the data processing system 110. Both the bit streams included in the tracking message and stored on the database 150 may correspond to the predesignated frame 188 or the subset portion of the predesignated frame 188. In some implementations, bitstream comparator 140 can access the database 150 to identify the bit stream corresponding to the predesignated frame 188 or the subset portion of the predesignated frame 188 using the identifier for the video content element 184 included in the tracking message. In some implementations, responsive to receiving the tracking message for the video content element 184, the bitstream comparator 140 can identify or otherwise calculate the bit stream corresponding to the predesignated frame 188 or the subset portion of the predesignated frame 188. In some implementations, prior to the comparison, the bitstream comparator 140 can decrypt the bit stream in the tracking message using the encryption key included in the tracking message In some implementations, prior to the comparison, the bitstream comparator 140 can decrypt the bit stream in the tracking message using another encryption key (e.g., a private key in a public key cryptography scheme). In some implementations, the bit stream comparator 140 can decrypt the combination value included in the tracking message using the encryption key used to generate the combination value.

If the bit stream included in the tracking message matches the bit stream identified at the data processing system 110, the render verifier 145 can determine or otherwise verify that the video content element 184 is rendered at the client device 125. The render verifier 145 can identify the device identifier in the tracking message. The render verifier 145 can access the database 150 to search for the device identifier. The database 150 can include a list of device identifiers as having received the video content element 184. The render verifier 145 can determine whether the device identifier in the tracking message is included in the database 150. The render verifier 145 can identify the video content identifier in the tracking message. The render verifier 145 can identify access the database 150 to search for the video identifier. The render verifier 145 can find a match between the video content identifier with one included in the database 150. The render verifier 145 can access the database 150 using the frame identifier and the video content identifier. The render verifier 145 can determine whether the frame identifier and the video content identifier match any of those stored at the database 150. The render verifier 145 can identify the time stamp included in the message. The render verifier 145 can access the database 150 to search for time stamps of when the video content element 184 was transmitted via the network 105. If the time stamp is within any of those in the database 150 within a predetermined margin, the render verifier 145 can identify the time stamp included in the tracking message as matching one in the database 150. The render verifier 145 can identify the frame identifier included in the tracking message.

If any one or more the information included in the tracking message matches information stored in the database 150 in addition to the bit stream included in the tracking message matching the bit stream identified at the database processing system 110, the render verifier 145 can make a record that the video content element 184 has been rendered at the client device 125. The record may be stored at the database 150 to check at a later time whether and/or when a particular video content element 184 was rendered at a particular client device 125. In some implementations, the render verifier 145 can update a view count for the video content element 184. Responsive to determining that the video content element 184 is rendered at the client device 125 and finding the device identifier of the tracking message in the database 150, the render verifier 145 can also update a view count for the video content element 184. In some implementations, the render verifier 145 may maintain a counter at the database 150 to keep track of the view count for the video content element 184. In some implementations, responsive to bit stream included in the tracking message matching the bit stream identified at the data processing system 110, the render verifier 145 can increment the counter for the view count for the video content element 184. On the other hand, if the bit stream included in the tracking message does not match the bit stream identified at the data processing system 110, the render verifier 145 can determine that the video content element 184 was not properly rendered at the client device 125 and the render verifier 145 can maintain the view count for the video content element 184 at the previous value. In some implementations, the render verifier 145 can alert a network administrator of the data processing system 110 of a potential malicious third-party device attempting to fake tracking events to falsify the record of whether the video content element 184 was rendered at a client device 125 or to boost the view count of the video content element 184.

Given that the video content element 184 including the predesignated frame 188 is encrypted described herein, other devices connected to the network 105 (e.g., malicious third parties) may have difficulty to repeatedly mimicking the tracking message, thereby preventing fraudulent tracking events. In this manner, the system 100 may increase the accuracy of the view count of the video content element 184. Furthermore, rendering and display of the video content element 184 at the client device 125 may be verified.

Figure 6:
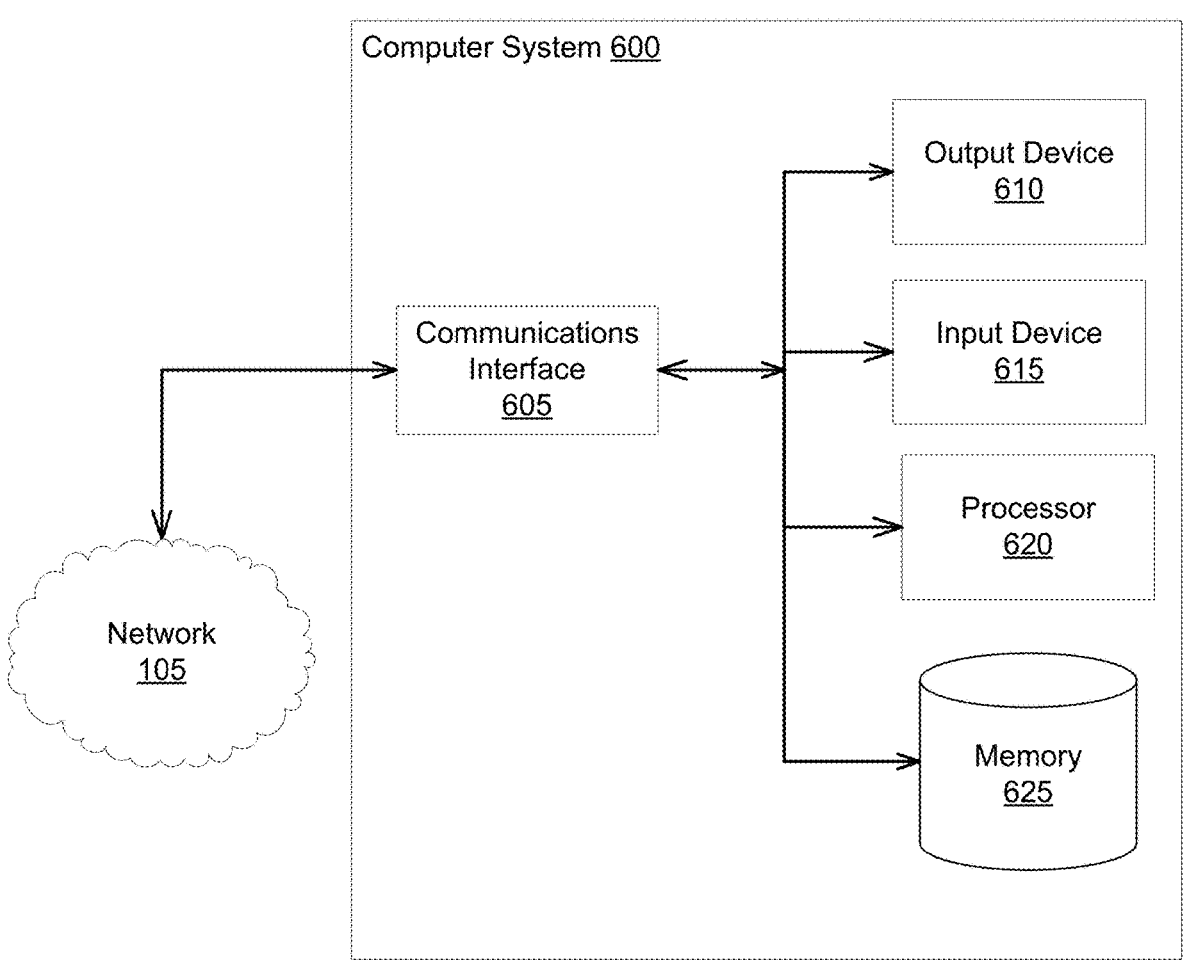
FIG. 6 is a block diagram illustrating a general architecture for a computer system that may be employed to implement elements of the systems and methods described and illustrated herein, according to an illustrative implementation.

Now referring to FIG. 3, FIG. 3 is a flow diagram depicting a method 300 of verifying the rendering of video content on information resources, in accordance to an illustrative implementation. The functionality described herein with respect to method 300 can be performed or otherwise executed by the data processing system 110 as shown on FIG. 1 or a computing device as shown in FIG. 6 or any combination thereof. In brief overview, the data processing system can transmit a video content element to a client device (BLOCK 305). The video content element may have a first bit stream corresponding to a predesignated frame. The data processing system can compare a second bit stream included in a tracking message from a client device with a third bit stream maintained at a database for the video content element (BLOCK 310). The data processing system can determine that the video content element is rendered at the client device, responsive to the second bit stream from the client device matching the third bit stream maintained at the database (BLOCK 320).

In further detail, the data processing system can transmit a video content element to a client device (BLOCK 305). The data processing system can receive a request for video content from the client device. The request may be to insert video content into an information resource loaded by the application of the client device. In some embodiments, the request may be generated by the client device in loading the information resource. The request for video content can include a device identifier corresponding to the client device. The request for video content can include an address for a specific video content element (e.g., using a Uniform Resource Locator (URL) such as "www.example.com/home/example.html"). The request for video content can include an identifier for the specific video content element.

Using the request received from the client device, the data processing system can identify the video content element from the database. The database may include one or more video content elements (e.g., a video content element) arranged by the address or the identifier. The data processing system can access the database using the address or identifier for the video content included in the request to retrieve or obtain the video content element. The video content element may include one or more frames. In some implementations, the video content element may include a single frame so that the video content element appears as a static image on the I/O interface of the client device.

The video content element may be a compressed video. Each of the one or more frames may have an encoding type (e.g., intra-frame or inter-frame). Some of the one or more frames of the video content element may be intra-coded pictures (I-frames). Intra-coded picture frames may include a full static image, independent of the other frames. Some of the one or more frames of the video content element may be predicted pictures (P-frames). Predicted picture frames may be dependent on a previous frame and may include changes in the image at the frame from the previous frame. Some of the one or more frames of the video content element may be bi-predictive pictures (B-frames). Bi-predictive picture frames may be dependent on a previous frame and a subsequent frame and may include changes in the image at the frame from the previous and the subsequent frames. The video content element may correspond to a binary sequence (e.g., a byte array or a byte stream). Each of the frames of the video content element may correspond to a portion of the binary sequence (e.g., a bit stream).

With the video content element retrieved from the database, the data processing system can select a verification policy to apply to verify rendering of the video content element at the client device. There may be two verification policies: a first verification policy and a second verification policy. The data processing system can select the verification policy based on the retrieved video content element. In some implementations, the data processing system can identify one or more attributes of the video content element (e.g., time duration, dimensions, file size, etc.) to select the verification policy. The data processing system can select the verification policy based on the client device. In some implementations, the data processing system can identify one or more properties of the video content element (e.g., device type, memory, network bandwidth, processing power, etc.) in selecting the verification policy. The data processing system can select the verification policy randomly (e.g., by using a pseudo-number generator). Once selected, the data processing system can modify the video content element in setting or inserting a predesignated frame used to verify rendering of the video content element at the client device in accordance with the verification policy. The data processing system can also store the selected verification policy with the identifier for the video content element and the device identifier for the client device on the database.

Under the first verification policy (mode A), the data processing system can select one of the frames of the video content element as a predesignated frame based on computational complexity in processing the frames. In some implementations, the data processing system can calculate or estimate a computational complexity metric for each frame. The computational complexity metric may include process time, processor usage, memory usage, and power consumption, among other attributes, in processing the respective frame at the client device. The data processing system can run a simulated processing of the video content element to measure, among other attributes, an estimated process time, estimated processor usage, estimated memory usage, and estimated power consumption. In estimating the computational complexity metric, the data processing system can identify the encoding type of each frame. The data processing system can then determine changes in the bit stream between each frame based on the identified encoding type to estimate the computational complexity metric.

With the computational complexity metric for each frame calculated, the data processing system can identify the frame corresponding to the highest computational complexity metric. The data processing system can select the frame corresponding to the highest computational complexity metric as the predesignated frame. With the predesignated frame corresponding to the frame of the highest computational complexity metric, devices in the network may consume computer resources in processing the predesignated frame, thereby making it difficult to generate fraudulent tracking events. In some implementations, the data processing system can identify frames with computational complexity metrics greater than a predetermined threshold. From the identified frames with computational complexity metrics greater than the predetermined threshold, the data processing system can select one frame (or more) as the predesignated frame. The data processing system can also identify a bit stream corresponding to the predesignated frame. In some implementations, the data processing system can determine the encrypted bit stream corresponding to the predesignated frame. The data processing system can store the bit stream corresponding to the predesignated frame in the database.

The data processing system can also select one of the frames as the predesignated frame arbitrarily. In some implementations, the data processing system can identify a last frame of the video content element. The data processing system can select the last frame of the video content element as the predesignated frame. In some implementations, the data processing system can generate a frame number using a pseudo-random number generator. The frame number may range from one to a number of frames in the video content element. The data processing system can identify the frame corresponding to the generated frame number. The data processing system can select the identified frame as the predesignated frame. If the video content element includes a single frame, the data processing system can select the single frame as the predesignated frame. The data processing system can also identify a bit stream corresponding to the predesignated frame. In some implementations, the data processing system can determine the encrypted bit stream corresponding to the predesignated frame. The data processing system can store the bit stream corresponding to the predesignated frame in the database.

Still pursuant under the first verification policy, the data processing system can identify a subset portion of the predesignated frame. The subset portion may correspond to a rectangular region of the predesignated frame when displayed at the I/O interface of the client device. By designating the rectangular region, the data processing system may verify whether the subset portion of the predesignated frame is in fact rendered and displayed at the client device.

The data processing system can identify pixel dimensions of the rectangular region of the predesignated frame. In some implementations, the pixel dimensions can include a top left corner of the rectangular region and a bottom right corner of the rectangular region. The data processing system can select or designate the subset portion of the predesignated frame. The data processing system can also identify a bit stream corresponding to designated subset portion of the predesignated frame. In some implementations, the data processing system can calculate the bit stream corresponding to the subset portion of the predesignated frame. The data processing system can store the identified bit stream in the database.

Under the second verification policy (mode B), the data processing system can generate and insert a new frame into the video content element as the predesignated frame. The data processing system can generate the new frame into the video content element as the predesignated frame using any encoding type. In some implementations, the data processing system can generate the predesignated frame as an intra-coded picture independent of any frame in the video content element. In some implementations, the data processing system can generate the predesignated frame as a bi-predictive picture by using a previous and a subsequent frame. In some implementations, the data processing system can generate the predesignated frame as a predictive picture by using the previous frame. To prevent corruption or degradation of the video content element when the new frame is inserted, the data processing system can generate the predesignated frame as a dummy frame to preserve the encoding of the video content from the previous frame to the subsequent frame. In some implementations, the data processing system can set a rendering-enabled property of the predesignated frame to null in order to prevent rendering of the predesignated frame at the client device, thereby making the predesignated frame the dummy frame. The data processing system can then insert the predesignated frame into the video content element. If the encoding type is predicted or bi-predictive, the predesignated frame may be inserted by the data processing system at the corresponding sequence in the video content element. In some implementations, the data processing system can insert the predesignated frame into the video content element as the very last frame. The data processing system can also identify a bit stream corresponding to the predesignated frame. In some implementations, the data processing system can determine the encrypted bit stream corresponding to the predesignated frame. The data processing system can store the bit stream corresponding to the predesignated frame in the database.

To indicate to the client device to use the predesignated frame to send a verification message, the data processing system can include a designation indicator in the video content element. In some implementations, the designation indicator may include a verification policy identifier corresponding to the selected verification policy. In some implementations, the designation indicator may include the pixel dimensions corresponding to the subset portion of the predesignated frame. In some implementations, the data processing system can insert the designation indicator at the predesignated frame as a mark (e.g., a watermark or other invisible or imperceptible marker). In some implementations, the data processing system can insert the designation indicator in a header of the predesignated frame. In some implementations, the data processing system can insert the designation indicator in the metadata of the video content element. The designation indicator included in the metadata may include a frame number corresponding to the predesignated frame. In some implementations, the data processing system can transmit the designation indicator to the client device separately from the video content element.

With the predesignated frame selected or inserted into the video content element, the data processing system can transmit the video content element via the network. The transmission of the video content element may include streaming of the frames (e.g., as chunks). In some implementations, the data processing system can also transmit the client device. The client device and the client device may be used by the client device to process the predesignated frame to verify that the video content element is rendered at the client device. In some implementations, the client device and/or the client device may be previously loaded at the client device.

Prior to transmission, the data processing system can encrypt the video content element prior to transmission using various encryption algorithms (e.g., digital rights management schema such as Diffie-Hellman key exchange). The encryption and decryption of the video content element may be computationally complex. As such, it may be computationally expensive for other devices in the network attempting to decrypt the video content element to send fake tracking events in the manner detailed herein to boost the view counts of the video content element. The receipt of the video content element by the client device may cause the client device to perform the functionalities as detailed in FIG. 4.

Now referring to FIG. 4, FIG. 4 is a flow diagram depicting a method 400 of verifying the rendering of video content on information resources, in accordance to an illustrative implementation. The functionality described herein with respect to method 400 can be performed or otherwise executed by the client device 125 as shown in FIG. 1 or a computing device as shown in FIG. 6, or any combination thereof. In brief overview, the client device can receive, from a data processing system, the video content element having the first bit stream corresponding to the predesignated frame (BLOCK 405). The client device can identify the first bit stream corresponding to the predesignated frame of the video content element (BLOCK 410). The client device can decode the first bit stream corresponding to the predesignated frame of the video content element to generate a second bit stream (BLOCK 415). The client device can transmit a tracking message including the second bit stream to the data processing system (BLOCK 420).

In further detail, the client device can receive, from a data processing system, the video content element having the first bit stream corresponding to the predesignated frame (BLOCK 405). Subsequent to the request for video content, the client device can then receive the video content element from the data processing system. In some implementations, the client device can receive the designation indicator with the video content element. In some implementations, the client device can receive the designation indicator separate from the video content element from the data processing system.

Having loaded the video content element, the application can start to play the one or more frames of the video content element. The playing of the video content element may include streaming the one or more frames as the frames are received from the data processing system. In processing the one or more frames of the video content element, the application can invoke the trusted platform module to identify the bit stream corresponding to the frame and to decrypt the bit stream for rendering and display the frame on the I/O interface (as a secured output path).

As the video content element is processed, the client device can determine whether the current frame is the predesignated frame. The client device can use the designation indicator to identify the predesignated frame. In some implementations, the client device can use an image recognition algorithm to recognize the mark on the predesignated frame to identify the current frame as the predesignated frame. In some implementations, the client device can read the header of the current frame to identify the designation indicator to determine that the current frame is the predesignated frame. In some implementations, the client device can read the metadata of the video content element to identify the predesignated frame. The reading of the metadata may be prior to the playing of the video content element.

If the current frame is not the predesignated frame, the application may continue processing the video content element. The application can render the current frame. The application can then identify the next frame. The client device can then again determine whether the frame is the predesignated frame using the above listed techniques. This process may be repeated until the end of the video content element.

If the current frame is the predesignated frame, the client device can identify which verification policy is to be applied for verifying the rendering of the video content element. In some implementations, the client device can identify which verification policy is to be applied based on the designation indicator indicating the verification policy selected by the data processing system. In some implementations, the client device can identify which verification policy is to be applied based on a rendering-enabled property of the predesignated frame. If the rendering-enabled property of the predesignated frame is set to true, the client device may identify that the first verification policy is to be applied. If the rendering-enabled property of the predesignated frame is set to null, the client device may identify that the second verification policy is to be applied. Using the identified verification policy, the client device can invoke the trusted platform module to encode the predesignated frame for verifying the rendering of the video content element at the client device.

The client device can identify the first bit stream corresponding to the predesignated frame of the video content element (BLOCK 410). The client device can decode the first bit stream corresponding to the predesignated frame of the video content element to generate a second bit stream (BLOCK 415). Under the first verification policy, the client device can allow the application to render the predesignated frame for display on the I/O interface. In some implementations, the client device can identify the bit stream corresponding to predesignated frame. The bit stream may have been encrypted by the data processing system. Using the identified bit stream, the client device can invoke the trusted platform module to decrypt the bit stream corresponding to the predesignated frame to generate another bit stream using various decryption techniques (e.g., Diffie-Hellman key exchange, RSA, etc.). In some implementations, the client device can identify the predesignated frame (e.g., by using a frame sequence number). The client device can then invoke the trusted platform module to decrypt the bit stream corresponding to the predesignated frame by identifying the predesignated frame. The decoded bit stream may be part of the binary sequence used by the application to render and display the video content element on the I/O interface. In this manner, the client device can verify the rendering of the video content element including the predesignated frame at the client device.

The client device can transmit a tracking message including the second bit stream to the data processing system (BLOCK 420). In some implementations, the decoded bit stream may correspond to the designated subset portion of the predesignated frame. The client device can identify the designated subset portion of the predesignated frame from the designation identifier. In some implementations, the client device can identify the pixel dimensions of the subset portion of the predesignated frame from the designation identifier. In some implementations, the client device can identify the bit stream corresponding to designated subset portion of the predesignated frame or the pixel dimensions of the subset portion of the predesignated frame. Using the identified bit stream, the client device can invoke the trusted platform module to decrypt or otherwise recover the bit stream corresponding to the predesignated frame to generate another bit stream using various decryption techniques (e.g., Diffie-Hellman key exchange, RSA, cryptographic hash, etc.). The client device can invoke the trusted platform module to decrypt the bit stream corresponding to the predesignated frame by identifying the subset portion of the predesignated frame or the pixel dimensions of the subset portion of the predesignated frame. The decoded bit stream may be part of the binary sequence used by the application to render and display the subset portion of whatever is displayed within the pixel dimensions onto the I/O interface. In this manner, the client device can verify whether the rendering of the video content element including the subset portion of the predesignated frame at the client device is free from any occlusions.

Under the second verification policy, with the rendering-enabled property of the predesignated frame set to null, the application may drop the rendering of the predesignated frame. In some implementations, the client device can identify the bit stream corresponding to predesignated frame. The bit stream may have been encrypted by the data processing system. Using the identified bit stream, the client device can invoke the trusted platform module to decrypt or otherwise recover the bit stream corresponding to the pre-designated frame to generate another bit stream using various decryption techniques (e.g., Diffie-Hellman key exchange, RSA, cryptographic hash, etc.). In some implementations, the client device can identify the predesignated frame (e.g., using a frame sequence number). The client device can then invoke the trusted platform module to decrypt the bit stream corresponding to the predesignated frame by identifying the predesignated frame. The decoded bit stream may be part of the binary sequence used by the application to process the video content element for rendering on the I/O interface had the rendering property of the predesignated frame been set to true. In this manner, the client device can verify the rendering of the video content element without actually rendering the predesignated frame at the client device.

With the bit stream of the predesignated frame decoded, the client device can generate a tracking message for transmission to the data processing system. The tracking message may include information identifying the predesignated frame. The tracking message may also include the device identifier corresponding to the client device. The tracking message may also include the identifier or address corresponding to the video content element. The tracking message may include the decoded bit stream corresponding to the predesignated frame. In some implementations, the tracking message may include the decoded bit stream corresponding to the subset portion of the predesignated frame.

Once generated, the client device can transmit the tracking message to the data processing system.

In some implementations, prior to transmission of the tracking message, the client device can invoke the trusted platform module to encrypt the decoded bit stream corresponding to the predesignated frame or the subset portion of the predesignated frame. The trusted platform module may encrypt, authenticate, or otherwise sign the decoded bit stream using an encryption key (e.g., a public key provided by the data processing system). The encryption key may have been received with the video content element or the designation indicator for the predesignated frame. The client device can include or insert the encrypted decoded bit stream into the tracking message. In some implementations, the client device can insert or include the encryption key used to encrypt, authenticate, or otherwise sign the decoded bit stream into the tracking message.

The client device can invoke the trusted platform module to generate a combination value using the information included in the tracking message (e.g., the frame identifier, the video content identifier, device identifier, time stamp, and/or decoded bit stream corresponding to the predesignated frame, etc.). In some implementations, the combination value may be a keyed-hash message authentication code (HMAC) generated based on the information included in the tracking message and an encryption key (e.g., a secret hash key). In some implementations, the client device can include or insert the encryption key used to generate the combination value (e.g., HMAC) into the tracking message. In some implementations, the encryption key included in the tracking message may differ from the one used to generate the combination value (e.g., with extra padded zeroes).

The client device can then transmit the tracking message with the encrypted decoded bit stream to the data processing system. The decoded bit stream for the predesignated frame or the subset portion thereof may be hidden from devices connected to the network that intend to create fraudulent tracking events to boost a view count for the video content element, thus resulting in a more accurate count of the number of times the video content element was in fact rendered and displayed at the client device.

Upon receipt of the tracking message, the data processing system can compare the bit stream included in the tracking message with the bit stream identified at the data processing system. Both the bit streams included in the tracking message and stored on the database may correspond to the predesignated frame or the subset portion of the predesignated frame. In some implementations, data processing system can access the database to identify the bit stream corresponding to the predesignated frame or the subset portion of the predesignated frame using the identifier for the video content element included in the tracking message. In some implementations, responsive to receiving the tracking message for the video content element, the data processing system can identify or otherwise calculate the bit stream corresponding to the predesignated frame or the subset portion of the predesignated frame. In some implementations, prior to the comparison, the data processing system can decrypt the bit stream in the tracking message using the encryption key included in the tracking message. In some implementations, prior to the comparison, the data processing system can decrypt the bit stream in the tracking message using another encryption key (e.g., a private key in a public key cryptography scheme). In some implementations, the data processing system can decrypt the combination value included in the tracking message using the encryption key used to generate the combination value.

Receipt of the tracking message by the data processing system may cause the data processing system to perform the remaining functionalities of method 300 of FIG. 3.

Returning to FIG. 3, the video content element may have a first bit stream corresponding to a predesignated frame. The data processing system can compare a second bit stream included in a tracking message from a client device with a third bit stream maintained at a database for the video content element (BLOCK 310). Upon receipt of the tracking message, the data processing system can compare the bit stream included in the tracking message with the bit stream identified at the data processing system. Both the bit streams included in the tracking message and stored on the database may correspond to the predesignated frame or the subset portion of the predesignated frame. In some implementations, the data processing system can access the database to identify the bit stream corresponding to the predesignated frame or the subset portion of the predesignated frame using the identifier for the video content element included in the tracking message. In some implementations, responsive to receiving the tracking message for the video content element, the data processing system can identify or otherwise calculate the bit stream corresponding to the predesignated frame or the subset portion of the predesignated frame. In some implementations, prior to the comparison, the data processing system can decrypt the bit stream in the tracking message using another encryption key (e.g., a private key in a public key cryptography scheme).

The data processing system can determine that the video content element is rendered at the client device, responsive to the second bit stream from the client device matching the third bit stream maintained at the database (BLOCK 320). If the bit stream included in the tracking message matches the bit stream identified at the data processing system, the data processing system can determine or otherwise verify that the video content element is rendered at the client device. The data processing system can identify the device identifier in the tracking message. The data processing system can access the database to search for the device identifier. The database can include a list of device identifiers as having received the video content element. The data processing system can determine whether the device identifier in the tracking message is included in the database. The data processing system can identify the video content identifier in the tracking message. The data processing system can identify access the database to search for the video identifier. The data processing system can find a match between the video content identifier with one included in the database. The data processing system can access the database using the frame identifier and the video content identifier. The data processing system can determine whether the frame identifier and the video content identifier match any of those stored at the database. The data processing system can identify the time stamp included in the message. The data processing system can access the database to search for time stamps of when the video content element was transmitted via the network. If the time stamp is within any of those in the database within a predetermined margin, the data processing system can identify the time stamp included in the tracking message as matching one in the database. The data processing system can identify the frame identifier included in the tracking message.

If any one or more the information included in the tracking message matches information stored in the database in addition to the bit stream included in the tracking message matching the bit stream identified at the database processing system, the data processing system can make a record that the video content element has been rendered at the client device. The record may be stored at the database to check at a later time whether and/or when a particular video content element was rendered at a particular client device. In some implementations, the data processing system can update a view count for the video content element. Responsive to determining that the video content element is rendered at the client device and finding the device identifier of the tracking message in the database, the data processing system can also update a view count for the video content element. In some implementations, the data processing system may maintain a counter at the database to keep track of the view count for the video content element. In some implementations, responsive to bit stream included in the tracking message matching the bit stream identified at the data processing system, the data processing system can increment the counter for the view count for the video content element. On the other hand, if the bit stream included in the tracking message does not match the bit stream identified at the data processing system, the data processing system can determine that the video content element was not properly rendered at the client device and the data processing system can maintain the view count for the video content element at the previous value. In some implementations, the data processing system can alert a network administrator of a potential malicious third-party device attempting to fake tracking events to falsify the record of whether the video content element was rendered at a client device to boost the view count of the video content element.

Given that the video content element including the predesignated frame is encrypted described herein, other devices connected to the database (e.g., malicious third parties) may have difficulty repeatedly mimicking the tracking message, thereby preventing fraudulent tracking events. In this manner, the data processing system may increase the accuracy of the view count of the video content element. Furthermore, rendering and display of the video content element at the client device may be verified.

Figure 5A:
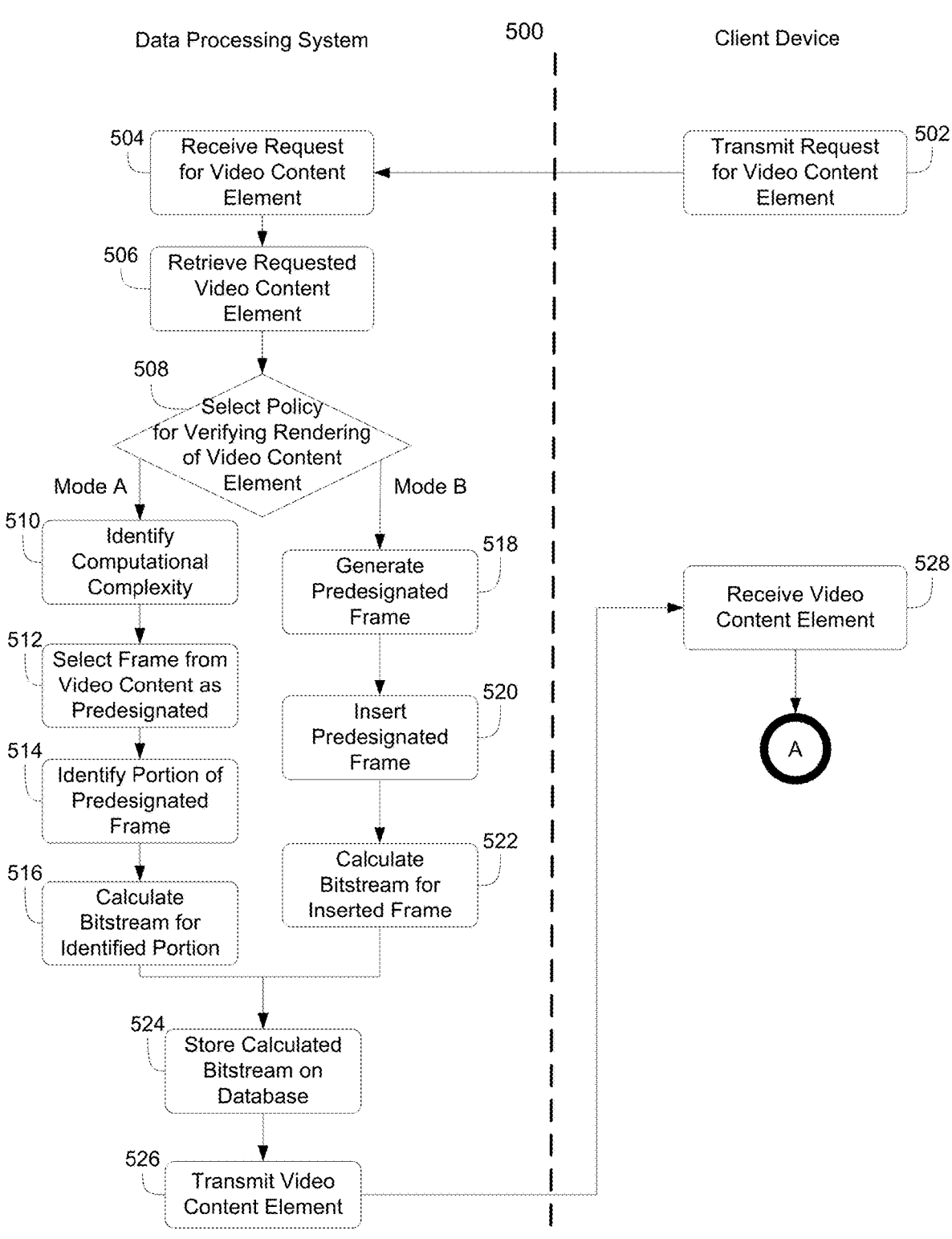
FIGS. 5A and 5B are flow diagrams depicting a method of verifying the rendering of video content on information resources, according to an illustrative implementation.
Figure 5B:
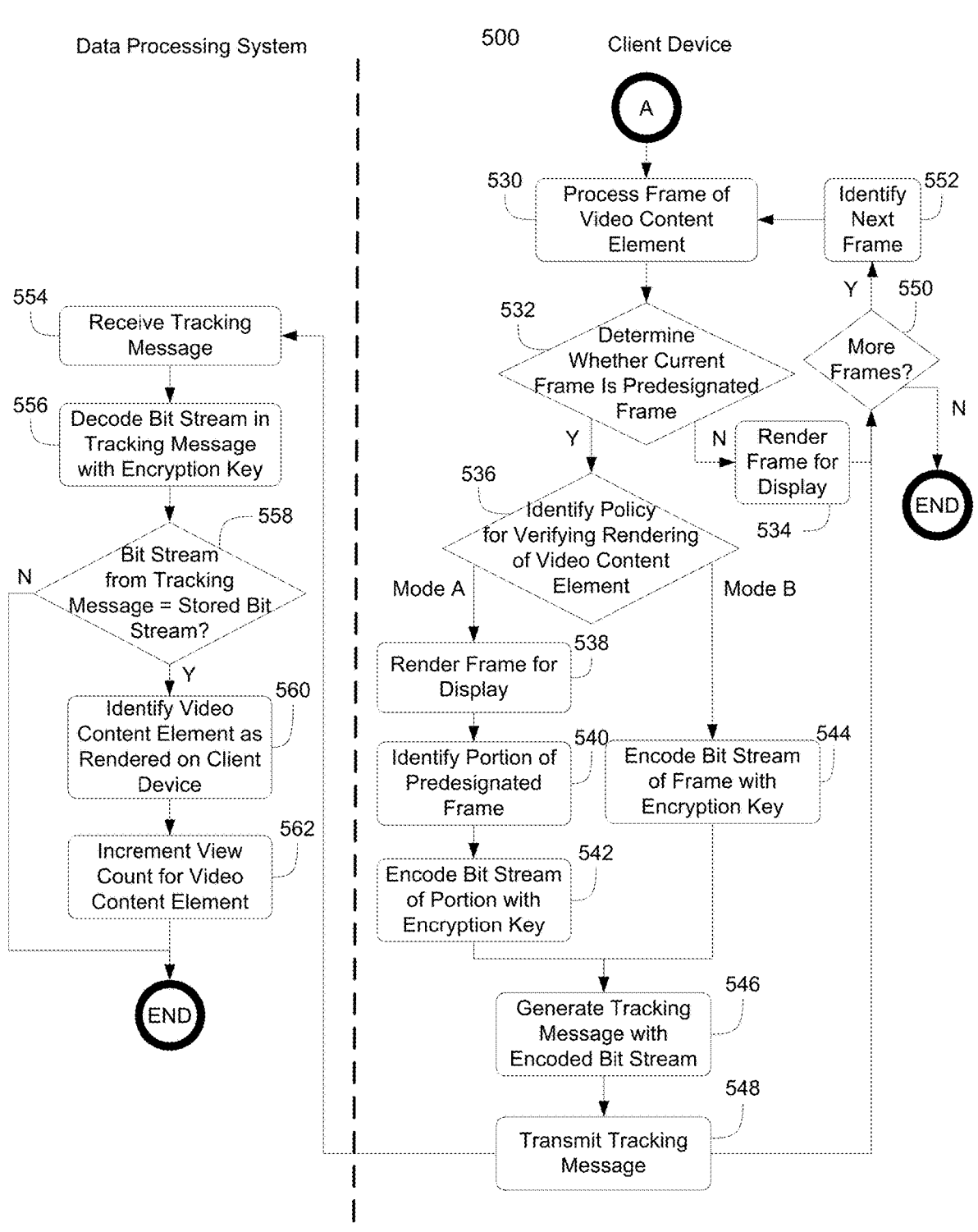

FIGS. 5A and 5B are a flow diagram depicting a method 500 of verifying the rendering of video content on information resources, according to an illustrative implementation. The functionality described herein with respect to method 500 can be performed or otherwise executed by the data processing system 110 and the client device 125 as shown in FIG. 1, or a computing device as shown in FIG. 6, or any combination thereof. In overview, starting from FIG. 5A, the client device can transmit a request for a video content element. (BLOCK 502). The data processing system can receive the request for the video content element (BLOCK 504). The data processing system can retrieve the requested video content element (BLOCK 506). The data processing system can select a policy for verifying the rendering of the video content element (BLOCK 508).

If mode A, the data processing system can identify a computational complexity of each frame in the video content element (BLOCK 510). The data processing system can select a frame from the video content element corresponding to the highest computational complexity as the predesignated frame (BLOCK 512). The data processing system can identify a portion of the predesignated frame (BLOCK 514). The data processing system can calculate a bit stream for the identified portion of the predesignated (BLOCK 516). If mode B, the data processing system can generate a predesignated frame (BLOCK 518). The data processing system can insert the predesignated frame into the video content element (BLOCK 520). The data processing system can calculate the bit stream for the predesignated frame inserted into the video content element (BLOCK 522). Subsequently, the data processing system can store the calculated bit stream for the predesignated frame or the portion of the predesignated frame of the video content element (BLOCK 524). The data processing system can transmit the video content element with the predesignated frame to the client device (BLOCK 526). The client device can receive the video content element (BLOCK 528).

Moving to FIG. 5B, the client device can process a frame of the video content element (BLOCK 530). The client device can determine whether the current frame is the predesignated frame (BLOCK 532). If the current frame is not the predesignated frame, the client device can render the current frame for display (BLOCK 534). If the current frame is the predesignated frame, the client device can identify a policy for verifying the rendering of the video content element (BLOCK 536). If mode 1, the client device can render the predesignated frame for display (BLOCK 538). The client device can identify the portion of the predesignated frame (BLOCK 540). The client device can identify and encode the bit stream of the portion of the predesignated frame with an encryption key (BLOCK 542). If mode B, the client device can identify the encoded bit stream of the predesignated frame with the encryption key (BLOCK 544). The client device can generate a tracking message with the encoded bit stream (BLOCK 546). The client device can transmit the tracking message to the data processing system (BLOCK 548). The client device can proceed to determine whether there are more frames in the video content element (BLOCK 550). If there is another video content element, the client device can identify the next frame (BLOCK 552) and can repeat the functionality of BLOCK 530. If there are no more frames, the client device can terminate method 500.

Continuing on, the data processing system can receive the tracking message (BLOCK 554). The data processing system can decode the bit stream in the tracking message with another encryption key (BLOCK 556). The data processing system can determine whether the bit stream from the tracking message matches the bit stream stored in the database (BLOCK 558). If the bit streams match, the data processing system can identify the video content element as rendered at the client device (BLOCK 560). The data processing system can increment the view count for the video content element (BLOCK 562). In either case, the data processing system can subsequently terminate method 500.

FIG. 6 shows the general architecture of an illustrative computer system 600 that may be employed to implement any of the computer systems discussed herein (including the data processing system 110 and its components, such as the content deliverer 130, the policy manager 135, the bitstream comparator 140, and the render verifier 145, and the client device 125 and its components, such as the application 180, the frame verifier 190, and the message 192) in accordance with some implementations. The computer system 600 can be used to provide information via the network 105 for display. The computer system 600 of FIG. 6 comprises one or more processors 620 communicatively coupled to memory 625, one or more communications interfaces 605, and one or more output devices 610 (e.g., one or more display units) and one or more input devices 615. The processors 620 can be included in the data processing system 110 or the other components of the data processing system 110 such as the content deliverer 130, the policy manager 135, the bitstream comparator 140, and the render verifier 145. The processors can be included in the client device 125, such as the application 180, the frame verifier 190, and the message generator 192.

In the computer system 600 of FIG. 6, the memory 625 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the data processing system 110 can include the memory 625 to store information related to the availability of inventory of one or more content units, reservations of one or more content units, among others. The memory 625 can include the database 150. The processor(s) 620 shown in FIG. 6 may be used to execute instructions stored in the memory 625 and, in so doing, also may read from or write to the memory various information processed and or generated pursuant to execution of the instructions.

The processor 620 of the computer system 600 shown in FIG. 6 also may be communicatively coupled to or made to control the communications interface(s) 605 to transmit or receive various information pursuant to execution of instructions. For example, the communications interface(s) 605 may be coupled to a wired or wireless network, bus, or other communication means and may therefore allow the computer system 600 to transmit information to or receive information from other devices (e.g., other computer systems). While not shown explicitly in the system of FIG. 1 or FIG. 6, one or more communications interfaces facilitate information flow between the components of the system 600. In some implementations, the communications interface(s) may be configured (e.g., via various hardware components or software components) to provide a website as an access portal to at least some aspects of the computer system 600. Examples of communications interfaces 605 include user interfaces (e.g., webpages), through which the user can communicate with the data processing system 110.

The output devices 610 of the computer system 600 shown in FIG. 6 may be provided, for example, to allow various information to be viewed or otherwise perceived in connection with execution of the instructions. The input device(s) 515 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 105).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The content deliverer 130, the policy manager 135, the bitstream comparator 140, and the render verifier 145 can include or share one or more data processing apparatuses, computing devices, or processors. The application 180, the frame verifier 190, and the message generator 192 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as system 600 or system 100 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. The content deliverer 130, policy manager 135, bitstream comparator 140, and the render verifier 145 can be part of the data processing system 110, a single module, a logic device having one or more processing modules, one or more servers, or part of a search engine. In addition, the application 180, frame verifier 190, and the message generator 192 can include or can be part of the client device 125, a single module, or a logic device having one or more processing module. The content deliverer 130, the policy manager 135, the bitstream comparator 140, and the render verifier 145 can include or share one or more data processing apparatuses, computing devices, or processors, and be part of the data processing system 110, a single module, or a logic device having one or more processing module.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to verifying the rendering of video content on information resources and deploying countermeasures thereto, the systems and methods described herein can include applied to other environments. The foregoing implementations are illustrative rather than limiting of the described systems and methods. The scope of the systems and methods described herein is thus indicated by the appended claims, rather than the foregoing description, and changes that come within the meaning and range of equivalency of the claims are embraced therein.

What is claimed is:

1. A method of generating a tracking message, the method comprising:

receiving, at a client device, a coded first bit stream representing a content item comprising a plurality of image frames, the coded first bit stream including a predesignated frame selected, by a server, based on a computation complexity of decoding the predesignated frame;

in a trusted platform module of the client device:

decoding the first bit stream to recover frames of the content item, generating a second bit stream representative of frames of the content item based on the decoded first bit stream, sending the second bit stream to an output interface; and generating a tracking message including an identification of the client device and information identifying at least a portion of the predesignated frame of the content item processed by the trusted platform module; and transmitting the tracking message from the client device.

2. The method of claim 1, wherein the tracking message includes information identifying the predesignated frame of the content item recovered by the trusted platform module of the client device from the first bit stream.

3. The method of claim 1, wherein the tracking message includes information identifying the last frame of the content item recovered by the trusted platform module of the client device from the first bit stream.

4. The method of claim 1, wherein the tracking message includes information identifying a frame of the content item included in the second bit stream sent by the trusted platform module of the client device to the output interface.

5. The method of claim 4, wherein the tracking message includes information identifying the last frame of the content item included in the second bit stream by the trusted platform module of the client device to the output interface.

6. The method of claim 1, further comprising authenticating, by the trusted platform module, the tracking message to indicate the tracking message was generated by the trusted platform module before the tracking message is transmitted from the client device.

7. The method of claim 1, wherein sending the second bit stream to the output interface comprises sending the second bit stream to the output interface over a secure output path.

8. The method of claim 1, further comprising encrypting the second bit stream before sending the second bit stream to the output interface.

9. A system for generating a tracking message, the system comprising:

a client device having one or more processors and a trusted platform module; and a memory storing machine readable instructions that, when executed, cause the client device to:

receive a coded first bit stream representing a content item comprising a plurality of image frames, the coded first bit stream including a predesignated frame selected, by a server, based on a computation complexity of decoding the predesignated frame;

in the trusted platform module of the client device:

decode the first bit stream to recover frames of the content item, generate a second bit stream representative of frames of the content item based on the decoded first bit stream, send the second bit stream to an output interface; and generate a tracking message including an identification of the client device and information identifying at least a portion of the predesignated frame of the content item processed by the trusted platform module; and transmit the tracking message from the client device.

10. The system of claim 9, wherein the tracking message includes information identifying the predesignated frame of the content item recovered by the trusted platform module of the client device from the first bit stream.

11. The system of claim 9, wherein the tracking message includes information identifying the last frame of the content item recovered by the trusted platform module of the client device from the first bit stream.

12. The system of claim 9, wherein the tracking message includes information identifying a frame of the content item included in the second bit stream sent by the trusted platform module of the client device to the output interface.

13. The system of claim 12, wherein the tracking message includes information identifying the last frame of the content item included in the second bit stream by the trusted platform module of the client device to the output interface.

14. The system of claim 9, wherein the memory stores further machine readable instructions that, when executed, cause the client device to:

authenticate, by the trusted platform module, the tracking message to indicate the tracking message was generated by the trusted platform module before the tracking message is transmitted from the client device.

15. The system of claim 9, wherein sending the second bit stream to the output interface comprises sending the second bit stream to the output interface over a secure output path.

16. The system of claim 9, wherein the memory stores further machine readable instructions that, when executed, cause the client device to:

encrypt the second bit stream before sending the second bit stream to the output interface.

17. A tangible, non-transitory computer readable medium storing machine readable instructions, for generating a tracking message that, when executed, cause one or more processors of a client device to:

receive, at the client device, a coded first bit stream representing a content item comprising a plurality of image frames, the coded first bit stream including a predesignated frame selected, by a server, based on a computation complexity of decoding the predesignated frame;

in a trusted platform module of the client device:

decode the first bit stream to recover frames of the content item, generate a second bit stream representative of frames of the content item based on the decoded first bit stream, send the second bit stream to an output interface; and generate a tracking message including an identification of the client device and information identifying at least a portion of the predesignated frame of the content item processed by the trusted platform module; and transmit the tracking message from the client device.

18. The tangible, non-transitory computer readable medium of claim 17, wherein the tracking message includes information identifying the predesignated frame of the content item recovered by the trusted platform module of the client device from the first bit stream.

19. The tangible, non-transitory computer readable medium of claim 17, wherein the tracking message includes information identifying the last frame of the content item recovered by the trusted platform module of the client device from the first bit stream.

20. The tangible, non-transitory computer readable medium of claim 17, wherein the tracking message includes information identifying a frame of the content item included in the second bit stream sent by the trusted platform module of the client device to the output interface.

* * * * *